(12) United States Patent
England et al.

(10) Patent No.: US 8,879,825 B2
(45) Date of Patent: *Nov. 4, 2014

(54) METHOD AND APPARATUS FOR DISPLAYING A CALCULATED GEOMETRIC ENTITY WITHIN ONE OR MORE 3D RANGEFINDER DATA SETS

(75) Inventors: James N. England, Chapel Hill, NC (US); Aron T. Helser, Chapel Hill, NC (US); Benjamin C. Elgin, Hillsborough, NC (US); Richard L. Holloway, Chapel Hill, NC (US)

(73) Assignee: DeltaSphere, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,622

(22) Filed: Jul. 1, 2011

(65) Prior Publication Data
US 2011/0255749 A1    Oct. 20, 2011

Related U.S. Application Data

(63) Continuation of application No. 11/351,245, filed on Feb. 9, 2006, now Pat. No. 7,974,461.

(60) Provisional application No. 60/652,208, filed on Feb. 11, 2005.

(51) Int. Cl.
| | |
|---|---|
| *G06K 9/00* | (2006.01) |
| *G01C 15/00* | (2006.01) |
| *G06T 15/00* | (2011.01) |
| *G06T 11/00* | (2006.01) |

(52) U.S. Cl.
CPC ............ *G06T 11/001* (2013.01); *G01C 15/002* (2013.01); *G06K 9/00* (2013.01); *G06T 15/00* (2013.01)
USPC ........... 382/154; 382/103; 382/106; 382/190; 382/280

(58) Field of Classification Search
CPC .... G01C 15/002; G06T 11/001; G06T 15/00; G06T 17/10; G06T 15/002; G06T 17/05; G06T 2207/10028; G06T 19/00; G06T 2200/04; A41H 1/00; G06Q 10/10; G06F 17/18; G06F 17/509; G01S 15/8993; A61B 6/5235; H04N 1/6008

USPC .......................... 382/106, 190, 154; 345/424
See application file for complete search history.

(56) References Cited

U.S. PATENT DOCUMENTS 4,418,361 A * 11/1983 Bagnall-Wild et al. ....... 348/169
5,309,212 A    5/1994 Clark
(Continued)

FOREIGN PATENT DOCUMENTS

WO    WO 2007/035720 A2    3/2007

OTHER PUBLICATIONS

Notice of Allowance and Fee(s) Due for U.S. Appl. No. 11/351,245 (Apr. 11, 2011).

(Continued)

*Primary Examiner* — Vu Le
*Assistant Examiner* — Aklilu Woldemariam
(74) *Attorney, Agent, or Firm* — Jenkins, Wilson, Taylor & Hunt, P.A.

(57) ABSTRACT

A method, computer program product, and apparatus for displaying a calculated geometric entity within at least one 3D range data set obtained using a 3D rangefinder device. At least a first 3D range data set is provided. Each 3D range data set is displayed as at least one displayed image. A calculated geometric entity that represents a non-physical entity is specified. The calculated geometric entity is displayed merged within at least one displayed image, where the calculated geometric entity represents something other than the physical objects represented by the first 3D range data set.

21 Claims, 13 Drawing Sheets
(8 of 13 Drawing Sheet(s) Filed in Color)

(56) References Cited

U.S. PATENT DOCUMENTS

| | | | |
|---|---|---|---|
| 5,488,952 A * | 2/1996 | Schoolman | 600/443 |
| 5,557,711 A * | 9/1996 | Malzbender | 345/422 |
| 5,577,130 A | 11/1996 | Wu | |
| 5,633,951 A | 5/1997 | Moshfeghi | |
| 5,694,530 A * | 12/1997 | Goto | 345/419 |
| 5,715,166 A | 2/1998 | Besl et al. | |
| 5,734,384 A | 3/1998 | Yanof et al. | |
| RE35,798 E * | 5/1998 | Kimura | 345/424 |
| 5,764,280 A * | 6/1998 | Bloom et al. | 348/53 |
| 5,878,152 A | 3/1999 | Sussman | |
| 5,986,662 A * | 11/1999 | Argiro et al. | 345/424 |
| 5,988,862 A | 11/1999 | Kacyra et al. | |
| 6,009,212 A | 12/1999 | Miller et al. | |
| 6,009,359 A | 12/1999 | El-Hakim et al. | |
| 6,014,457 A * | 1/2000 | Kubo et al. | 382/167 |
| 6,049,622 A * | 4/2000 | Robb et al. | 382/128 |
| 6,061,469 A * | 5/2000 | Walterman | 382/154 |
| 6,083,162 A | 7/2000 | Vining | |
| 6,246,468 B1 | 6/2001 | Dimsdale | |
| 6,246,898 B1 | 6/2001 | Vesely et al. | |
| 6,276,211 B1 * | 8/2001 | Smith | 73/626 |
| 6,346,940 B1 | 2/2002 | Fukunaga | |
| 6,424,877 B1 * | 7/2002 | Kondo et al. | 700/117 |
| 6,480,270 B1 * | 11/2002 | Studnicka et al. | 356/141.1 |
| 6,483,950 B1 | 11/2002 | Wallack | |
| 6,484,048 B1 * | 11/2002 | Hoshino et al. | 600/410 |
| 6,512,518 B2 | 1/2003 | Dimsdale | |
| 6,553,152 B1 | 4/2003 | Miller et al. | |
| 6,590,640 B1 | 7/2003 | Aiken et al. | |
| 6,621,451 B1 * | 9/2003 | Fisher et al. | 342/185 |
| 6,628,279 B1 | 9/2003 | Schell et al. | |
| 6,704,099 B2 | 3/2004 | Uomori et al. | |
| 6,717,654 B1 * | 4/2004 | Rajchel et al. | 356/4.01 |
| 6,759,979 B2 | 7/2004 | Vashisth et al. | |
| 6,828,983 B1 | 12/2004 | Vijayakumar et al. | |
| 6,915,008 B2 | 7/2005 | Barman et al. | |
| 6,922,234 B2 | 7/2005 | Hoffman et al. | |
| 6,952,204 B2 | 10/2005 | Baumberg et al. | |
| 6,970,591 B1 | 11/2005 | Lyons et al. | |
| 6,980,690 B1 | 12/2005 | Taylor et al. | |
| 6,992,685 B2 * | 1/2006 | Hallbauer et al. | 345/619 |
| 7,002,576 B2 * | 2/2006 | Sheffield et al. | 345/424 |
| 7,010,175 B2 | 3/2006 | Barfuss et al. | |
| 7,054,793 B2 | 5/2006 | Moritz et al. | |
| 7,177,486 B2 | 2/2007 | Stewart et al. | |
| 7,206,462 B1 | 4/2007 | Betke et al. | |
| 7,215,430 B2 | 5/2007 | Kacyra et al. | |
| 7,247,825 B2 * | 7/2007 | Sonksen et al. | 250/201.3 |
| 7,274,811 B2 * | 9/2007 | Sirohey et al. | 382/128 |
| 7,321,849 B2 * | 1/2008 | Brumitt et al. | 703/13 |
| 7,403,268 B2 | 7/2008 | England et al. | |
| 7,477,359 B2 | 1/2009 | England et al. | |
| 7,477,360 B2 | 1/2009 | England et al. | |
| 7,485,041 B2 * | 2/2009 | Katsuragawa et al. | 463/34 |
| 7,551,771 B2 | 6/2009 | England, III | |
| 7,777,761 B2 | 8/2010 | England et al. | |
| 7,974,461 B2 | 7/2011 | England et al. | |
| 2005/0028111 A1 | 2/2005 | Schrag et al. | |
| 2005/0213809 A1 * | 9/2005 | Lees et al. | 382/154 |
| 2005/0280714 A1 | 12/2005 | Freeman | |
| 2006/0034513 A1 | 2/2006 | Cai et al. | |
| 2006/0115133 A1 | 6/2006 | Potter et al. | |
| 2006/0181527 A1 | 8/2006 | England et al. | |
| 2006/0182314 A1 | 8/2006 | England et al. | |
| 2006/0193521 A1 | 8/2006 | England et al. | |
| 2006/0244746 A1 | 11/2006 | England et al. | |
| 2007/0064976 A1 | 3/2007 | England, III | |

OTHER PUBLICATIONS

Examiner-Initiated Interview Summary for U.S. Appl. No. 11/351,245 (Dec. 20, 2010).

Non-Final Office Action for U.S. Appl. No. 11/351,245 (Aug. 13, 2010).

Notice of Allowance and Fee(s) Due for U.S. Appl. No. 11/351,234 (Apr. 5, 2010).

Final Office Action for U.S. Appl. No. 11/351,245 (Feb. 2, 2010).

Interview Summary for U.S. Appl. No. 11/351,234 (Dec. 31, 2009).

Non-Final Office Action for U.S. Appl. No. 11/351,234 (Sep. 11, 2009).

Non-Final Office Action for U.S. Appl. No. 11/351,245 (Jul. 28, 2009).

Interview Summary for U.S. Appl. No. 11/351,234 (May 20, 2009).

Notice of Allowance and Fee(s) Due for U.S. Appl. No. 11/523,292 (Feb. 19, 2009).

Office Action for U.S. Appl. No. 11/351,234 (Feb. 17, 2009).

Office Action for U.S. Appl. No. 11/351,245 (Feb. 17, 2009).

Interview Summary for U.S. Appl. No. 11/523,292 (Jan. 9, 2009).

Notice of Allowance and Fee(s) Due in U.S. Appl. No. 11/351,248 (Sep. 29, 2008).

Notice of Allowance and Fee(s) Due for U.S. Appl. No. 11/351,246 (Sep. 4, 2008).

Non-Final Official Action in U.S. Appl. No. 11/523,292 (Jul. 7, 2008).

Non-Final Official Action in U.S. Appl. No. 11/351,234 (Apr. 29, 2008).

Notice of Allowance and Fee(s) Due for U.S. Appl. No. 11/351,235 (Mar. 31, 2008).

Non-Final Official Action in U.S. Appl. No. 11/351,248 (Jan. 23, 2008).

Non-Final Official Action in U.S. Appl. No. 11/351,246 (Jan. 22, 2008).

Office Action for U.S. Appl. No. 11/351,235 (Nov. 6, 2007).

Notification of Transmittal of the International Search Report and the Written Opinion of the International Searching Authority, or the Declaration for International Application No. PCT/US06/36459 (Oct. 23, 2007).

Ellekilde et al., "Fusing Range and Intensity Images for Generating Dense Models of Three-Dimensional Environments," Proceedings of the 2006 IEE International Conference on Man-Machine Systems (Sep. 2006).

Kil et al., "Laser Scanner Super-resolution," Eurographics Symposium on Point-Based Graphics (Jul. 29-30, 2006).

Leica Geosystems, "Leica Cyclone 5.4 Technical Specifications," Product Literature, http://www.leica-geosystems.com/hds/en/Cyclone_5.4_Technical_Specifications.pdf (Mar. 15, 2006).

3RDTECH Inc., "SceneVision-3D Functions," Product Literature, http://www.deltasphere.com/scenevision_specs.htm (Feb. 28, 2006).

Canesta Inc., "CanestaVision Chips," http://www.canesta.com/html/sensors.htm (2006).

Acuity Research, "Accurange Line Scanner," Product Literature, http://www.acuityresearch.com/pdf/line-scanner-data-sheet.pdf (Oct. 17, 2005).

Oggier et al., "SwissRanger SR3000 and First Experiences based on Miniaturized 3D-TOF Cameras," Proceedings of the 1st Range Imaging Research Day at ETH Zurich, Switzerland (Sep. 8-9, 2005).

Acuity Research, "AccuRange 4000 laser rangefinder," Product Literature, http://www.acuityresearch.com/pdf/ar4000-data-sheet.pdf (Feb. 10, 2005).

3RDTECH Inc, "Revolutionary 3D Scene Capture, Viewing and Analysis," Product Literature, http://www.deltasphere.com/images/deltaspheredatasheet_112204s.pdf (Nov. 22, 2004).

Stone et al., "Performance Analysis of Next-Generation Ladar for Manufacturing, Construction, and Mobility," National Institutes of Standards and Technology NISTIR 7117 (May 2004).

Gokturk et al., "A Time-of-Flight Depth Sensor—System Description, Issues and Solutions," 2004 Conference on Computer Vision and Pattern Recognition Workshop (CVPRW'04), vol. 3.

Canesta Inc., "Development Platform DP100" (Jun. 26, 2003).

Park et al., "Super-Resolution Image Reconstruction: A Technical Overview," IEEE Signal Processing Magazine (May 2003).

Innovmetric Inc., "PolyWorks Total Point Cloud Inspection and Reverse-Engineering Software Solution," Product Literature, http://www.innovmetric.com/Manufacturing/pdf/brochureWeb.pdf (2003).

(56) References Cited

OTHER PUBLICATIONS

Bernardini et al., "The 3D Model Acquisition Pipeline," vol. 21, No. 2, pp. 149-172, Computer D Graphics Forum (2002).

Nyland et al., "Capturing, Processing and Rendering Real-World Scenes," Videometrics and Optical Methods for 3D Shape Measurement, Electronic Imaging 2001, Photonics West, SPIE vol. 4309 (Jan. 22, 2001).

Lee et al., "Henry Lee's Crime Scene Handbook," Elsevier Academic Press (Copyright 2001). (Part 1 of 4, pp. 1-120).

Lee et al., "Henry Lee's Crime Scene Handbook," Elsevier Academic Press (Copyright 2001). (Part 2 of 4, pp. 121-257).

Lee et al., "Henry Lee's Crime Scene Handbook," Elsevier Academic Press (Copyright 2001). (Part 3 of 4, pp. 258-337).

Lee et al., "Henry Lee's Crime Scene Handbook," Elsevier Academic Press (Copyright 2001). (Part 4 of 4, pp. 338-418).

Wonder, "Blood Dynamics," Academic Press (Copyright 2001). (Part 1 of 2, pp. 1-81).

Wonder, "Blood Dynamics," Academic Press (Copyright 2001). (Part 2 of 2, pp. 82-168).

3RDTECH Inc, "DeltaSphere 3000 Laser 3D Scene Digitizer," Product Literature (Jun. 22, 2000).

Acuity Research, "AccuRange 4000, Accurange High Speed Interface, Accurange Line Scanner User's Manual," Product Manual, Menlo Park, California (Dec. 15, 1999).

Han et al., "Feature Recognition from CAD Models," IEEE Computer Graphics and Applications, pp. 80-94 (Mar./Apr. 1998).

Nielson et al., "Scientific Visualization: Overviews, Methodologies, and Techniques," The Institute of Electrical and Electronics Engineers, Inc. (Copyright 1997). (Part 1 of 4, pp. 1-153).

Nielson et al., "Scientific Visualization: Overviews, Methodologies, and Techniques," The Institute of Electrical and Electronics Engineers, Inc. (Copyright 1997). (Part 2 of 4, pp. 154-319).

Nielson et al., "Scientific Visualization: Overviews, Methodologies, and Techniques," The Institute of Electrical and Electronics Engineers, Inc. (Copyright 1997). (Part 3 of 4, pp. 320-480).

Nielson et al., "Scientific Visualization: Overviews, Methodologies, and Techniques," The Institute of Electrical and Electronics Engineers, Inc. (Copyright 1997). (Part 4 of 4, pp. 481-577).

Foley et al., "Computer Graphics: Principles and Practice, Second Edition in C," Addison-Wesley (Copyright 1996). (Part 1 of 7, pp. 1-122).

Foley et al., "Computer Graphics: Principles and Practice, Second Edition in C," Addison-Wesley (Copyright 1996). (Part 2 of 7, pp. 123-253).

Foley et al., "Computer Graphics: Principles and Practice, Second Edition in C," Addison-Wesley (Copyright 1996). (Part 3 of 7, pp. 254-565).

Foley et al., "Computer Graphics: Principles and Practice, Second Edition in C," Addison-Wesley (Copyright 1996). (Part 4 of 7, pp. 566-702).

Foley et al., "Computer Graphics: Principles and Practice, Second Edition in C," Addison-Wesley (Copyright 1996). (Part 5 of 7, pp. 703-843).

Foley et al., "Computer Graphics: Principles and Practice, Second Edition in C," Addison-Wesley (Copyright 1996). (Part 6 of 7, pp. 844-1018).

Foley et al., "Computer Graphics: Principles and Practice, Second Edition in C," Addison-Wesley (Copyright 1996). (Part 7 of 7, pp. 1019-1175).

Boyd, "Limited-Angle Computed Tomography for Sandwich Structures Using Data Fusion," Journal of Nondestructive Evaluation, vol. 14, No. 2, pp. 61-76 (1995).

Jensen et al., "Subpixel Edge Localization and the Interpolation of Still Images," IEEE Transactions on Image Processing, vol. 4, No. 3, pp. 285-295 (Mar. 1995).

Everett, "Sensors for Mobile Robots Theory and Application," A K Peters, Ltr. (Copyright 1995). (Part 1 of 3, pp. 1-165).

Everett, "Sensors for Mobile Robots Theory and Application," A K Peters, Ltr. (Copyright 1995). (Part 2 of 3, pp. 166-346).

Everett, "Sensors for Mobile Robots Theory and Application," A K Peters, Ltr. (Copyright 1995). (Part 3 of 3, pp. 347-528).

Turk et al., "Zippered Polygon Meshes from Range Images," Computer Graphics, ACM SIGGRAPH 94 Proceedings, Orlando, Fla., pp. 311-318 (1994).

Besl et al., "A Method for Registration of 3-D Shapes," IEEE Transactions on Pattern Analysis and Machine Intelligence, vol. 14, No. 2, pp. 239-256.

Arun et al., "Least-Squares Fitting of Two 3D Point Sets," IEEE Transactions on Pattern Analysis and Machine Intelligence, vol. 9, pp. 698-700 (1987).

Faugeras et al., "The Representation, Recognition, and Locating of 3-d Objects," International Journal of Robotic Research, vol. 5, No. 3, pp. 27-52 (Fall 1986).

Tsai, "An Efficient and Accurate Camera Calibration Technique for 3D Machine Vision," Proceedings of IEEE Conference on Computer Vision and Pattern Recognition, Miami Beach, FL, pp. 364-374 (1986).

MacDonell, "Flight Characteristics and Stain Patterns of Human Blood," PR 71-4, National Institute of Law Enforcement and Criminal Justice (Nov. 1971).

* cited by examiner

METHOD AND APPARATUS FOR DISPLAYING A CALCULATED GEOMETRIC ENTITY WITHIN ONE OR MORE 3D RANGEFINDER DATA SETS

CROSS-REFERENCE TO RELATED APPLICATIONS

This application is a continuation of U.S. patent application Ser. No. 11/351,245, filed Feb. 9, 2006, now U.S. Pat. No. 7,974,461 which claims the benefit of U.S. Provisional Patent Application Ser. No. 60/652,208, filed Feb. 11, 2005, the disclosures of which are incorporated by reference herein in their entireties.

FIELD OF THE INVENTION

The present invention relates to 3D rangefinder processing technology generally, and more particularly relates to methods, computer program products, and apparatus for displaying a calculated geometric entity within one or more 3D rangefinder data sets.

BACKGROUND OF THE INVENTION

A rangefinder is a device for measuring the range from the device to some physical surface. A laser rangefinder can be one of many known types of rangefinders. Laser rangefinders are sometimes known as LIDAR (Light Detection and Ranging) or LADAR (Laser Detection and Ranging) systems. Laser rangefinders use a variety of techniques to measure the range from the apparatus to a surface from which the laser beam is reflected. A typical apparatus may in some manner measure the round trip time-of-flight of the beam from the apparatus's emitter to the target, or the reflector, and back to the apparatus's receiver. One such apparatus is generally commercially available from Acuity Research and known as the AR4000 laser rangefinder, which can be found at URL http://www.acuityresearch.com, for example. Information on example laser rangefinder technology can be found in U.S. Pat. No. 5,309,212 which describes establishing an oscillator whose frequency is dependent on the time-of-flight of the laser beam and then measuring the time period of that oscillator. Since the speed of light is known, this time period measurement can then be readily converted to indicate the range from the apparatus to a surface that reflects the laser beam. A digital interface to a computer is typically included in such rangefinders. Other examples of laser and other rangefinders can be found in the text "Sensors for Mobile Robots: Theory and Application" by H. R. Everett (A. K. Peters, Ltd., 1995).

A rangefinder's laser beam may be directed in various directions by physically pointing the apparatus, by using one or more moving mirrors or prisms under manual or computer control, or both. A common configuration scans the beam in one plane and is called a line scanner, such as that sold commercially by Acuity Research and found at their website, for example. This apparatus includes a laser rangefinder that directs the beam end-on toward a rotating 45-degree mirror. The beam is thus turned at 90 degrees and sweeps out an arc as the 45-degree mirror rotates. The resulting data is a set of range data points representing the profile of an object or space. For example, if the scanned beam is directed at an automobile, a set of data points representing a profile of the automobile is produced.

The rangefinder's laser beam may also be directed to scan in two dimensions by physically pointing the apparatus, by using one or more moving mirrors or prisms, or both. As such the rangefinder's laser beam can thus acquire range measurements to a host of points within the environment. This type of apparatus is sometimes referred to as a scanning 3D laser rangefinder or just scanning laser rangefinder. In general, the three dimensions comprise two dimensions of scanning, such as X and Y, plus range or distance between the rangefinder and a point in space at which the laser beam is directed.

In order to acquire the range measurements to multiple points within an area, the rangefinder beam may be steered under manual or computer control. The steering may be accomplished directly through physical movement or optically through the use of mirrors or prisms. A scanning laser rangefinder sweeps the beam in two directions to cover an area. For example, a scanning laser rangefinder developed by Cyra Technologies Inc. sweeps the beam in an X,Y raster pattern through the use of mirrors. Information on the Cyra rangefinder technology is disclosed in U.S. Pat. No. 5,988,862. As a further example, we discuss the DeltaSphere 3000 laser scanner, such as 100 shown in FIG. 1. As seen, the laser scanner mounts on a tripod 105, includes a laser rangefinder 140, and is controlled by an embedded computer 150. The laser scanner sweeps the laser beam 110 in elevation using a rotating 45-degree mirror 120 and in azimuth by rotating 130 the laser and mirror assembly. Information on the DeltaSphere 3000 laser scanner product can be found at URL http://www.deltasphere.com. Further background on the technology for the DeltaSphere 3000 laser scanner can be found in "Capturing, Processing and Rendering Real-World Scenes", Videometrics and Optical Methods for 3D Shape Measurement, Electronic Imaging 2001, Photonics West, SPIE Vol. 4309 Jan. 22, 2001, an article by Lars Nyland, Anselmo Lastra, David K. McAllister, Voicu Popescu, and Chris McCue.

Other examples of scanning laser rangefinders can be found in "Sensors for Mobile Robots Theory and Application" by H. R. Everett (A. K. Peters, Ltd., 1995). The results of these scans are 3D data sets sometimes referred to as "3D point clouds". Similar data is provided by a rangefinder array design, such as those made commercially by Canesta Inc., also known as a range camera, that enables measurement of multiple range points at once. Information may be found at URL http://www.canesta.com/.

Various 3D rangefinder technologies may collect data at various rates ranging from 1 sample per second to several hundred thousand samples per second, but all provide essentially the same results, an array of 3D points where at least the range, elevation, and azimuth for each point is known. This representation in spherical coordinates may easily be transformed to X, Y, Z values in Cartesian coordinates. The rate of collecting the data points determines the time required to capture the data in the field, but obviously has no impact on later processing and use of the data. It will be clear that the methods discussed in this invention are independent of the speed of capture of the original data and that the methods apply to all forms of 3D rangefinder devices.

3D data sets collected by a 3D rangefinder may be presented as a visual display to a user in several different ways. The visualization techniques fall broadly into two classes, 3D displayed images and 2D displayed images.

A 3D displayed image format is one in which the user may select a particular 3D viewpoint and then view the 3D range data as geometric figures in perspective projection or in orthogonal projection or via some other projection within a 2D computer image. Techniques for creating 3D displayed images are well known from computer graphics textbooks such as "Computer Graphics: Principles and Practice in C" by James D. Foley, Andries van Dam, Steven K. Feiner, and John F. Hughes (Addison Wesley 1995). Well-known formats for a 3D displayed image may have the 3D range data samples represented as 3D points (also known as a point cloud) in which the same color is assigned to all points, in which false color is assigned to each point based on its range, in which color is assigned to each point based on its reflectance intensity (strength of the signal returned from a surface to the 3D rangefinder), or in which points are colored via any other scheme. In another well-known 3D display technique, the 3D range data points may be linked together into a 3D mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

A 2D displayed image is one in which the 3D range data set is inherently represented as a 2D image. There are several well-known techniques for creating 2D displayed images since the data from a typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. Of course, the 2D displayed image need not be represented in spherical projection, but in any other well-known projection of a 3D data set to a 2D display. As illustrated in FIG. 2, for example, each pixel may have a multiplicity of associated values stored with it, including precise azimuth angle value 210, precise elevation angle value 220, range value 230, reflectance value 240, color 250 (RGB), and any other useful values 260. For example, a useful value might be some other attribute associated with the pixel. The color of each pixel within the 2D displayed image may be determined in any of a number of well-known formats. A Range Image has a false color assigned to each pixel based on its range. A Reflectance Image has a color assigned to each pixel based on the intensity of the reflected laser beam. A Registered Color Image has a color assigned to each pixel based on the color obtained from a color sensor such as a 2D digital camera such that the range data and color data are aligned as shown in FIG. 3. A Registered Color Image may typically be created by the steps of capturing a 3D range data set with a 3D rangefinder and displaying it as a Reflectance Image 310, capturing a 2D image using a calibrated digital color camera and displaying it as a 2D color image 320, identifying corresponding features between the two 2D images such as 311 and 321, 312 and 322, 313 and 323, and 314 and 324, using the locations of the corresponding features to compute the pose (location and orientation) of the 2D digital color camera, using the camera pose information to compute the optical path from the camera into the 3D data set, and applying the color from each pixel of the 2D color image to corresponding points of the 3D data set displayed as a 2D image. Using this method, the 3D range data and 2D color image need not have been acquired from the same viewpoint. Further information on the mathematics underlying the 2D image registration process may be found in an article by R. Y. Tsai, "An Efficient and Accurate Camera Calibration Technique for 3D Machine Vision", Proceedings of IEEE Conference on Computer Vision and Pattern Recognition, Miami Beach, Fla., pp. 364-374, 1986.

Examples of a Range Image, a Reflectance Image, and a Registered Color Image may be found in an article by Lars Nyland, Anselmo Lastra, David K. McAllister, Voicu Popescu, and Chris McCue, titled "Capturing, Processing and Rendering Real-World Scenes", Videometrics and Optical Methods for 3D Shape Measurement, Electronic Imaging 2001, Photonics West, SPIE Vol. 4309 Jan. 22, 2001. The ability to create and display a Range Image, a Reflectance Image, and a Registered Color Image has been available in the DsControl, DsColor, and other software provided to DeltaSphere 3000 customers beginning some time ago.

When the 3D data set is displayed in any of the above formats, it is a well-known technique for a user to interactively select a particular pixel on the screen and to determine the X, Y, Z coordinates of the data represented at that pixel. In 2D displayed images, for example, the ability to select and display the X, Y, Z coordinates for any point in a Range Image, a Reflectance Image, and a Registered Color Image has been available in the DsControl and other software provided to DeltaSphere 3000 customers beginning some time ago. For 3D displayed images, commonly used computer graphics and computer-aided design software packages have enabled a user to pick a point, a point on a mesh, or a point on a surface and determine the X, Y, Z coordinates of that point. As another example, U.S. Pat. No. 6,922,234 discloses methods of making measurements within a reflectance image obtained from a laser scanner which captures data at up to 125,000 points per second.

It has been common practice for software packages to allow the user to make physical measurements within a 3D range data set, such as specifying data points on two surfaces, calculating the distance between them, and displaying a measurement line between those two data points. For example, this capability has been provided to DeltaSphere customers since some time ago. Other software packages, such as Cyclone from Cyra Technologies for example, have allowed users to fit geometric structures such as cylinders to 3D range data of pipes in a petrochemical plant and to subsequently view these cylinders in Computer Aided Design (CAD) software for visualization and planning. In conventional methods, techniques such as measurement and fitting of structures involve representation of physical entities. For example, the measurement represents distance between physical surfaces within the environment and the cylinders represent physical pipes.

There is, however, another class of calculated geometric entities separate from geometric entities representing actual physical structures. This additional class includes vectors, surfaces, and volumes representing non-physical entities, such as calculated points of origin, calculated paths of motion, calculated regions of fluid flow, and calculated swept volumes. Such calculated geometric entities are distinct in that they represent abstract, not physical structures. In conventional practice these calculated geometric entities may be displayed using well-known 3D graphics techniques and publications in the field of scientific visualization such as "Scientific Visualization: Overviews, Methodologies, and Techniques" by Gregory M. Nielson, Hans Hagen, and Heinrich Mueller (IEEE Computer Society 1997) are very much concerned with such techniques.

For example, the trajectory of a projectile is a calculated vector representing where the projectile might have traveled during a particular time, not a physical representation of the projectile itself. For another example, the origin of an explosion is a calculated point in space, not the physical explosive material. For instance, the line-of-sight of a person who might have been standing at a particular location is not a physical representation of the person's eyes, but a calculated reconstruction of the path along which objects would have been visible to the person. As another example, the area of the floor over which it is calculated a liquid would flow if a certain amount were poured from a particular height is a calculated surface and not a physical representation of the liquid. For example, the volume swept out by a person's path through a room is not a representation of the person, but of all the space throughout which the person's body moved. All of these are examples of calculated geometric entities and it should be readily apparent that there are a host of other useful examples of this class.

It would be advantageous in many applications, particularly in the reconstruction of crime, accident, and terrorism scenes, to be able to specify and display these forms of calculated geometric entities integrated with the 3D data representing an actual physical scene acquired using a 3D rangefinder. As such, the understanding, analysis, and presentation of what occurred at a scene would be greatly enhanced and new applications for 3D rangefinder technology could be enabled.

SUMMARY OF THE INVENTION

The present invention and its various embodiments seek to address at least some of the above needs and problems while attempting to deliver one or more of the above advantages. The present invention provides a number of embodiments that seek to allow a user to more effectively display a calculated geometric entity within one or more 3D range data sets. As such, the user can more productively interact with 3D range data sets to allow applications to be better served. The present invention provides methods, computer program products, and apparatuses displaying a calculated geometric entity within one or more 3D range data sets.

In a first embodiment, the present invention provides a method for displaying a calculated geometric entity within at least one 3D range data set obtained using a 3D rangefinder device. The method includes various steps therein. First, the method provides a first 3D range data set. The first 3D range data set can be represented as at least one displayed image. The method specifies a calculated geometric entity that represents a non-physical entity, i.e., the calculated geometric entity represents something other than the physical objects represented by the first 3D range data set. Further, the calculated geometric entity merged within said at least one displayed image may be displayed. Various other embodiments related to the preceding embodiment are provided.

A second embodiment of the invention provides a computer program product stored in computer readable media for execution in at least one processor. The computer program product may be used for displaying a calculated geometric entity within at least one 3D range data set obtained using a 3D rangefinder device. A number of software modules comprise this embodiment. A first software module is included for providing a first 3D range data set. In addition, a second software module for representing the first 3D range data set is provided. Further, the method provides a third software module for specifying a calculated geometric entity that represents a non-physical entity, i.e., the calculated geometric entity represents something other than the physical objects represented by the first 3D range data set. A fourth software module is included for displaying the calculated geometric entity merged within said at least one displayed image. Other embodiments related to the preceding computer program product embodiment are provided.

A third embodiment of the present invention comprises an apparatus for displaying a calculated geometric entity within at least one 3D range data set obtained using a 3D rangefinder device. The apparatus includes at least one computer processor therein, and a computer program product executing within the at least one computer processor. As such, a first software module is included for providing a first 3D range data set. Further, a second software module for representing the first 3D range data set is provided. In addition, the method provides a third software module for specifying a calculated geometric entity that represents a non-physical entity, i.e., the calculated geometric entity represents something other than the physical objects represented by the first 3D range data set. A fourth software module is included for displaying the calculated geometric entity merged within said at least one displayed image. Further embodiments related to the apparatus embodiment are provided by the present invention.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 13 is a diagram illustrating a 3D texture-mapped surface display representing a 3-D data set and showing simulated blood spatter along with calculated trajectories and images thereof, according to some embodiments of the present invention.

DETAILED DESCRIPTION OF THE INVENTION

Figure 1:
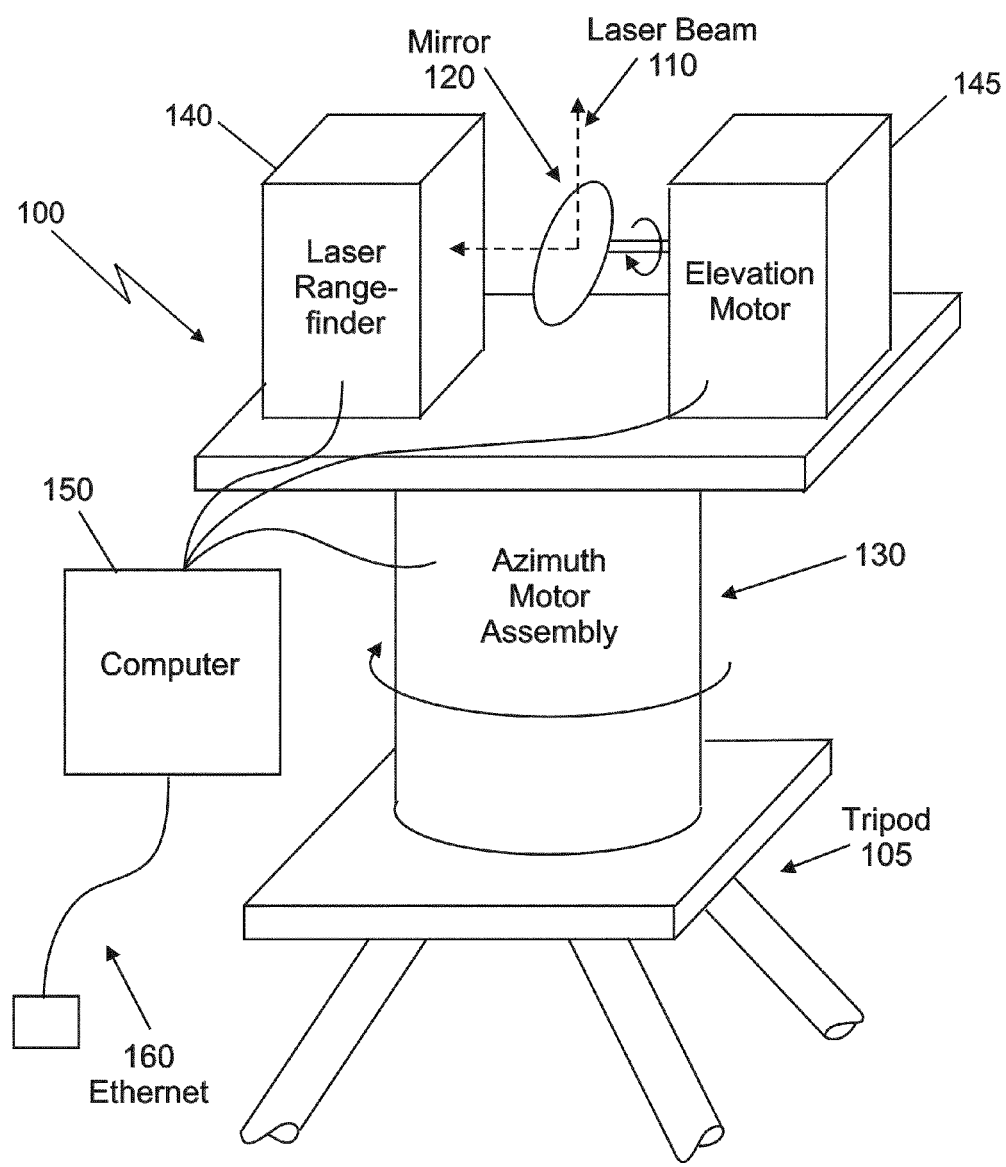
FIG. 1 is a diagram illustrating a conventional 3D scanning laser rangefinder.

The present invention now will be described more fully hereinafter with reference to the accompanying illustrative figures, in which various embodiments of the invention are shown. This invention may, however, be embodied in many different forms and should not be construed as limited to the embodiments set forth herein. Rather, these embodiments are provided so that this disclosure of the present invention will be thorough and complete, and will fully teach and describe the invention to those skilled in the art. Although specific terms are employed herein, they are used in a generic and descriptive sense only and not for purposes of limiting the scope of the present invention as defined by the attached claims in any way. Some terminology may be defined herein and used to describe forthcoming embodiments of the present invention, in order to teach the present invention to those skilled in the art. Terms not described explicitly in this disclosure should be construed as they would by those skilled in the art. Unless otherwise expressly limited, all terms used herein including technical and scientific terms, whether defined herein or not, are intended to have the broadest possible meaning as understood by one of ordinary skill in the art. It will be further understood that terms not explicitly defined herein should be interpreted as having the broadest possible meaning or meanings found in commonly used dictionaries, consistent with their meaning in the context of the relevant art. Some terms will be explicitly defined herein and used to describe embodiments of the present invention to those skilled in the art. Terms defined explicitly herein should be interpreted as the broader of their definition herein and their dictionary meanings. These defined terms should accordingly be construed according to their broadest possible meaning to skilled artisans in this field.

The Figures are provided for illustrative purposes for teaching purposes and to assist in understanding the present invention, and should not be viewed as precision blueprints or perfectly scaled drawings. In the drawings provided, the dimensions of features or regions may be exaggerated for clarity, readability, or the like. Features in the Figures may not be exactly to scale. The Figures are provided to show example embodiments of the present invention. Thus, embodiments of the present invention should not be construed as limited solely to the particular Figure or Figures illustrated herein but may include variations and deviations from many sources. Like numbers refer to like features or elements throughout. As used herein the term "and/or" includes any and all combinations of one or more of the associated listed items. Further, as used herein the term "at least" includes the number specified plus more than the number specified, unless explicitly limited otherwise.

As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, and/or components, but do not preclude the presence of one or more additional features, steps, operations, elements, components, and/or combinations thereof. Moreover, terms such as "horizontal", "vertical" and "perpendicular" indicate general directions or relationships rather than precise 0° or 90° orientations. Ranges and angles are approximate and are provided merely to teach the invention.

In one embodiment, the present invention provides a method for displaying a calculated geometric entity within at least one 3D range data set obtained using a 3D rangefinder device. The method includes various steps therein. First, the method provides a first 3D range data set. The first 3D range data set can be represented as at least one displayed image. The method specifies a calculated geometric entity selected from the group consisting of a vector, a surface, and a volume. Further, the calculated geometric entity merged within said at least one displayed image may be displayed. Various other embodiments related to the preceding embodiment are provided.

For some embodiments, displaying the calculated geometric entity may comprise displaying a variety of displays. A calculated 3D vector display, a calculated surface display, or a calculated volume display could be used to represent the calculated geometric entity. Further, a trajectory of some sort might represent a display of the calculated geometric entity. For example, a bullet trajectory display, a blood spatter trajectory display, an explosion debris trajectory display, or a display of the trajectory of some object may be displayed. In addition, a sight line display, or combinations of the above displays may also be used for displaying the calculated geometric entity. When there are at least two displayed images, displaying the calculated geometric entity may comprise displaying the calculated geometric entity merged within at least two displayed images.

Specifying or entering all or part of the calculated geometric entity can also be performed in a variety of ways. The calculated geometric entity can be manually entered, the calculated geometric entity can be entered from a computer file, or the calculated geometric entity may be automatically entered. Of course, combinations of the preceding can also be used. Entering or specifying at least some part of the calculated geometric entity can include providing various sorts of input. For instance, specifying may comprise inputting the length of a line perpendicular to a specified point on a specified surface, inputting the orientation of a line at a specified point on a specified surface, or inputting the diameter of a circle positioned with a specified center. For example, specifying may include inputting the direction of a bullet trajectory based on internal or external measurements, inputting the direction of blood spatter based on internal or external measurements, inputting the direction of explosion debris based on internal or external measurements, inputting the direction of a sight line based on internal or external measurements, or the like. Of course, combinations of the above ways of inputting can also be used.

Some embodiments of the method include additional process steps. For instance, the method can further comprise the step of providing at least a second displayed image from the first 3D range data set wherein the at least second displayed image comprises a display format different than the display format of the said at least one displayed image. Further, the method can include the step of representing the at least second displayed image. The method may further comprise the step of providing at least a second 3D range data set. Further, the step of representing the at least second 3D range data set as at least a second displayed image may also be provided in method embodiments.

For at least some embodiments, the second or any other 3D range data set may be provided in various ways. A 3D range data set can be obtained by the same 3D rangefinder device as the first 3D range data set but obtained from a different 3D location than the first 3D range data set. In addition, the second 3D range data set may be obtained by the same 3D rangefinder device as the first 3D range data set from the same 3D location but obtained at a different resolution than the first 3D range data set. The second 3D range data set can be obtained by the same 3D rangefinder device as the first 3D range data set from the same 3D location but obtained at a different time than the first 3D range data set. Also, the second 3D range data set can be being obtained by using a different 3D rangefinder device than was used for the first 3D range data set and obtained at the same 3D location as the first 3D range data set. Further, the second 3D range data set may be obtained by using a different 3D rangefinder device than was used for the first 3D range data set and obtained from a different 3D location. In addition, a second 3D range data set could be obtained by a different 3D rangefinder device than was used for the first 3D range data set and obtained at a different time.

In further embodiments, at least one displayed image comprises a variety of 2D images. A 2D image may be a 2D range image comprising range values from the 3D rangefinder device converted to monochrome, or a 2D range image comprising range values from the 3D rangefinder device converted to false color. For example, the 2D image could be a 2D reflectance image comprising intensity values of the rangefinding signal reflected from a physical surface and thereafter received by the 3D rangefinder device converted to monochrome, or a 2D reflectance image comprising intensity values of the rangefinding signal reflected from a physical surface and thereafter received by the 3D rangefinder device converted to false color. Further, a 2D range image could be a registered image such as a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, or a 2D registered color image wherein the image is acquired with different resolution from the 3D range data set. In addition, the 2D range image might be a 2D image displayed in spherical projection format, a 2D image displayed in any other 3D-to-2D projection format, or a 2D registered monochrome image comprising a monochrome camera image previously registered with 3D range data, for example.

Range data sets, such as the first 3D range data set, second 3D range data set, or the like, can be provided from various sources. For instance, a scanning laser rangefinder using time of flight range measurement principles, a scanning laser rangefinder using phase comparison range measurement principles, or a scanning laser rangefinder using any other range measurement principles could be used to provide 3D range data sets. An imaging laser rangefinder range camera using time of flight range measurement principles, an imaging laser rangefinder range camera using phase comparison range measurement principles, or an imaging laser rangefinder range camera using any other range measurement principles might provide 3D range data sets. In addition, a triangulation rangefinder, a stereo image rangefinder, a multiple image rangefinder, any other device that acquires a multiplicity of range data points simultaneously may be used. Also, any other device that acquires a multiplicity of range data points over a period of time, or combinations of the above could be used to provide 3D range data sets.

A number of embodiments provide various options with respect to what each displayed image might comprise. For instance, one displayed image could comprise a 3D point display, a 3D point display in orthogonal projection, or a 3D point display in perspective projection. A displayed image might also be a 3D polygonal mesh, a 3D polygonal mesh in orthogonal projection, a 3D polygonal mesh in perspective projection, a 3D surface geometry display, a 3D surface geometry display in orthogonal projection, or a 3D surface geometry display in perspective projection. Other options as well as combinations of the above options are possible for a displayed image.

Those skilled in the art will appreciate that the method embodiments can be implemented in any number of ways. The method could be implemented in a computer processor executing a suitable computer software program product therein. Further, the method may be implemented in a suitable computer software program product embodied on computer readable tangible media.

In a second embodiment, the invention provides a computer program product stored in computer readable media for execution in at least one processor. The computer program product may be used for displaying a calculated geometric entity within at least one 3D range data set obtained using a 3D rangefinder device. A number of software modules comprise this embodiment. A first software module is included for providing a first 3D range data set. In addition, a second software module for representing the first 3D range data set is provided. Further, the method provides a third software module for specifying a calculated geometric entity selected from the group consisting of a vector, a surface, and a volume. A fourth software module is included for displaying the calculated geometric entity merged within said at least one displayed image. Other embodiments related to the preceding computer program product embodiment are provided. The prior discussion related to the method embodiments applies also to the computer program product embodiments.

The present invention provides a third embodiment. This embodiment comprises an apparatus for displaying a calculated geometric entity within at least one 3D range data set obtained using a 3D rangefinder device. The apparatus includes at least one computer processor therein, and a computer program product executing within the at least one computer processor. As such, a first software module is included for providing a first 3D range data set. Further, a second software module for representing the first 3D range data set is provided. In addition, the method provides a third software module for specifying a calculated geometric entity selected from the group consisting of a vector, a surface, and a volume. A fourth software module is included for displaying the calculated geometric entity merged within said at least one displayed image. The present invention also provides other embodiments related to the preceding. Further, the prior discussion related to the method embodiments applies also to the apparatus embodiments. Next we discuss more details regarding various embodiments of the present invention.

Figure 4:
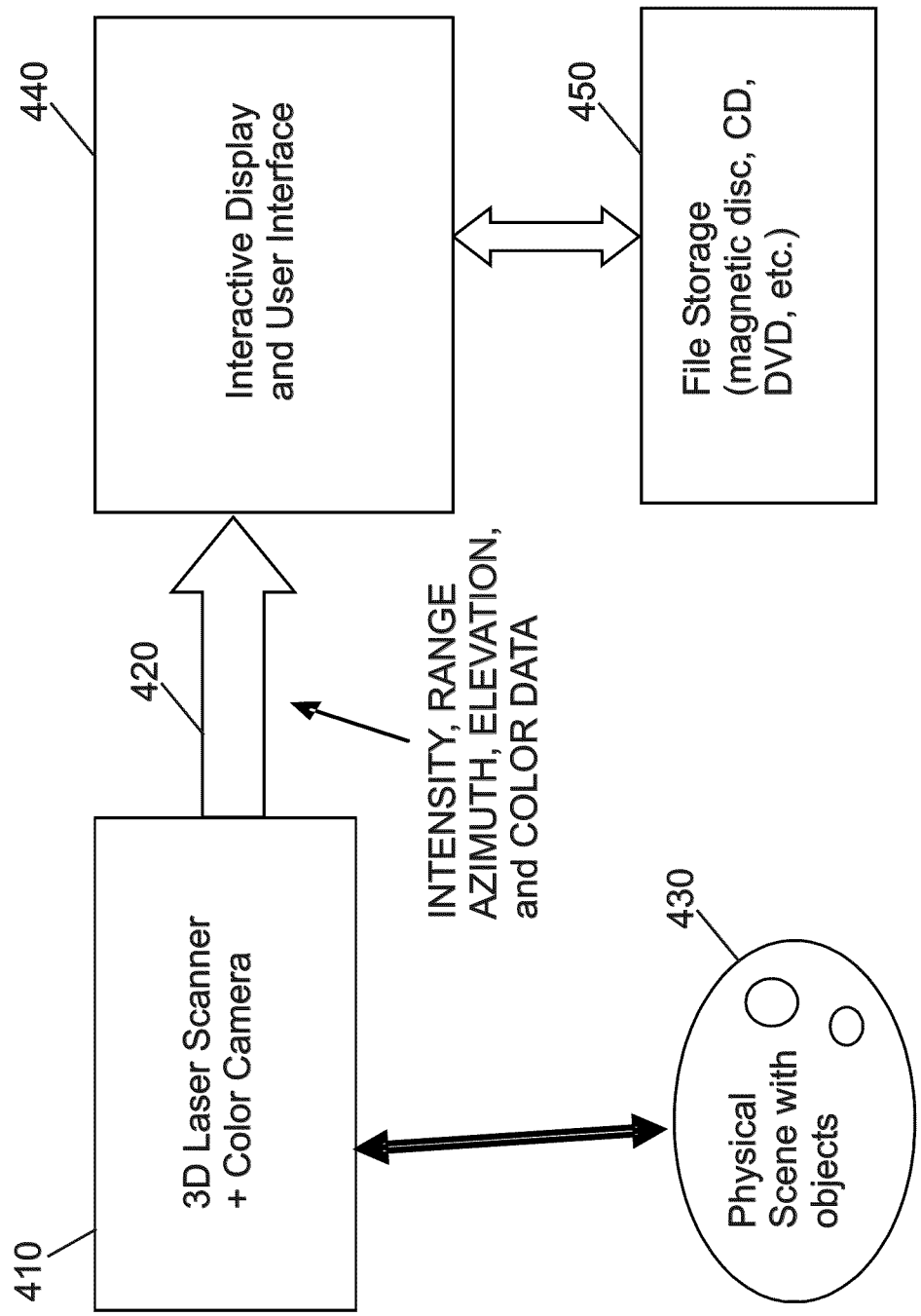
FIG. 4 is a diagram illustrating one example of the acquisition of a 3D range data set.

Referring to FIG. 4, a 3D rangefinder 410 is used to acquire a 3D range data set 420 from a physical object or scene 430. One 3D rangefinder 410 embodiment shown in FIG. 1 is a laser scanning 3D rangefinder 100 comprising a time-of-flight laser rangefinder 140, elevation scanning mirror 120 which is rotated by elevation motor 145, and azimuth rotating motor assembly 130. The 3D rangefinder such as shown in FIG. 1 also includes an embedded computer 150 for interfacing to and controlling the rangefinder 140, elevation motor 145, and azimuth motor 130. The embedded computer 150 communicates with any external computer via Ethernet 160 and also transfers data samples from the rangefinder, performs necessary data processing such as applying calibration tables, and passes data samples to the external computer for visualization, storage, and subsequent processing.

We see that in FIG. 4, the 3D range data set 420 for each data sample comprising intensity, range, azimuth, and elevation values is transferred to an external computer and presented in a computer display 440 for evaluation and control of laser scanning parameters such as resolution and speed. The data is simultaneously stored in a computer file 450 for later processing and display.

In some instances, a single 3D range data set 450 will be sufficient to represent the physical scene or objects of interest 430.

In other instances, two or more 3D range data sets such as 450 are typically acquired using the laser scanning 3D rangefinder 410 located at different locations around the scene. Other techniques for acquiring multiple 3D data sets 450 may be used including using the same rangefinder 410 at different times or at different resolutions and using two or more different 3D rangefinders 410. The operator must take care that there is some area of the scene that is overlapped by two or more acquisition scans so that a subsequent registration step may be readily performed.

After acquisition of two or more 3D range data sets 450 from a physical scene such as 430 with objects, a further step of registering the multiple data sets must be carried out. Typically, each data set to be registered is presented to a user via a computer display as a 3D set of points and the user then performs the step of identifying corresponding features within the 3D images representing the multiple data sets.

For example, the user might use a mouse or other control device to position a cursor such as a crosshairs over a desired pixel within a 3D displayed image. The corresponding X, Y, and Z values for that pixel are known, having been used to create the displayed pixel using well-known 3D computer graphics techniques. The user next proceeds to select as many pairs of features as desired as input to the next step of calculating the 3D transformation between two range data sets.

A minimum of three non-collinear pairs of corresponding 3D (X, Y, Z) points is needed to calculate the desired 3D rigid transformation using well-known techniques to solve for 3 rotation angles plus 3 translations, including those disclosed for example in 0. D. Faugeras and M. Hebert "The representation, recognition, and locating of 3-d objects", International Journal of Robotic Research, 5(3):27-52, Fall 1986. More points may be used along with well-known least-squares minimization techniques to obtain a better fit, as disclosed for example in K. Arun, T. Huang, and S. Blostein, "Least-Squares Fitting of Two 3D Point Sets", in IEEE Transactions on Pattern Analysis and Machine Intelligence, vol. 9 (1987), 698-700. Also the initial sets of corresponding features may be used as the starting points for algorithms such as the iterated closest point technique disclosed in P. J. Best and N. D. McKay, "A Method for Registration of 3-D Shapes", IEEE Transactions on Pattern Analysis and Machine Intelligence, Vol. 14 (1992), No. 2, 239-256. Additional references to registration techniques which might be used are given in Fausto Bernardini and Holly Rushmeier, "The 3D Model Acquisition Pipeline" Volume 21 (2002), number 2 pp. 149-172 COMPUTER GRAPHICS forum.

Having accomplished the step of registering two or more 3D data sets by computing the 3D transformation between them, the user can next merge all the 3D data sets into one combined 3D data set and display that combined 3D data set. Either a single original 3D data set or a 3D set which is the combination of multiple 3D data sets may now be displayed in preparation for the further step of integrating calculated geometric entities with the physical 3D data acquired using a 3D rangefinder.

Figure 5:
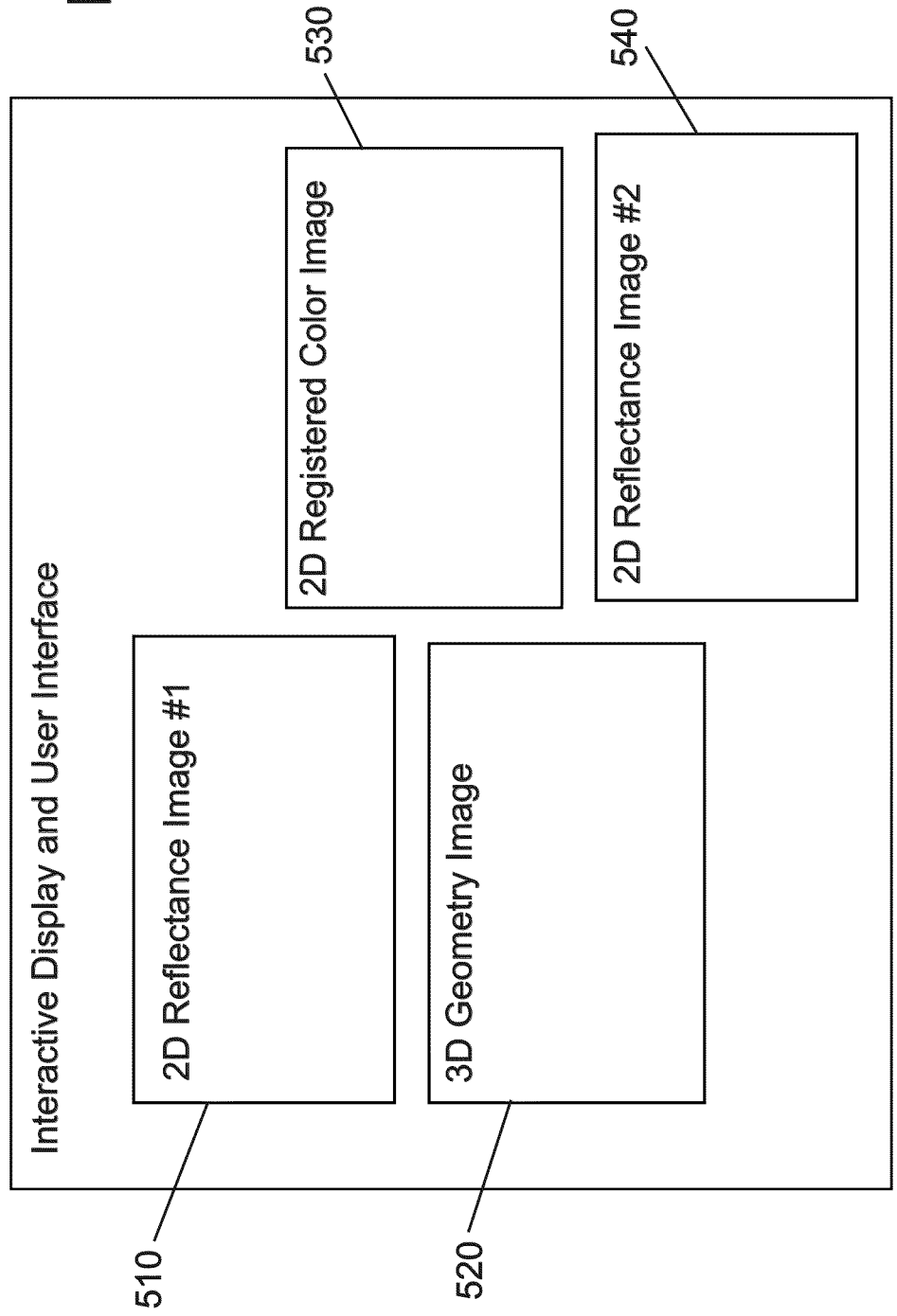
FIG. 5 is a diagram illustrating an example display of multiple images representing a 3D range data set, according to some embodiments of the present invention.

Next the 3D data set to be used is presented to a user via a computer display. The user may select from multiple formats which may be used for displaying this data as shown in FIG. 5. As an example, data from a 3D data set is represented in window 510, representing a 2D Reflectance Image for example, and window 520, representing a 3D geometric image on the display screen while data from a 3D data set is represented in windows 530 and 540 on the display screen. Window 540 may represent 2D Reflectance Image #2, and window 530 can represent a 2D Registered Color Image, for example.

A 3D displayed image format such as 520 is one in which the user may select a particular 3D viewpoint and then view the 3D range data as geometric figures in perspective projection or in orthogonal projection or via some other projection. Techniques for displaying collections of 3D data are well known from computer graphics textbooks such as "Computer Graphics: Principles and Practice in C" by James D. Foley, Andries van Dam, Steven K. Feiner, and John F. Hughes (Addison Wesley 1995). The display may represent range data samples as 3D points (also known as a point cloud) which may all be colored a single color, which may have false color assigned to each point based on its range, which may have color assigned to each point based on the intensity of the reflected laser beam, or colored via any other scheme. In another 3D display technique, the 3D range data points may be linked together into a displayed mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

Figure 2:
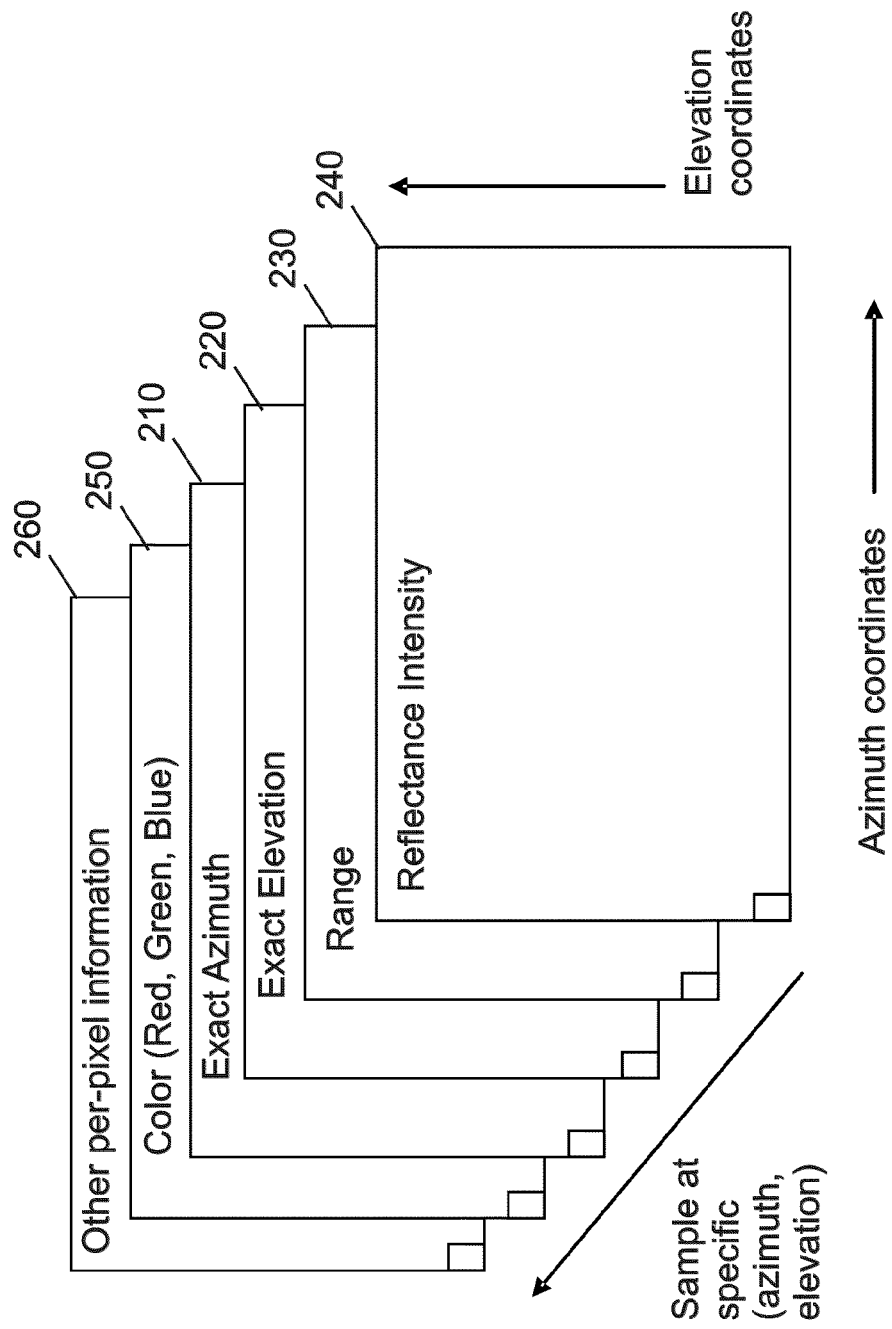
FIG. 2 is a diagram illustrating multiple example values that could be associated with a pixel within a 2D image representing a 3D range data set.
Figure 3:
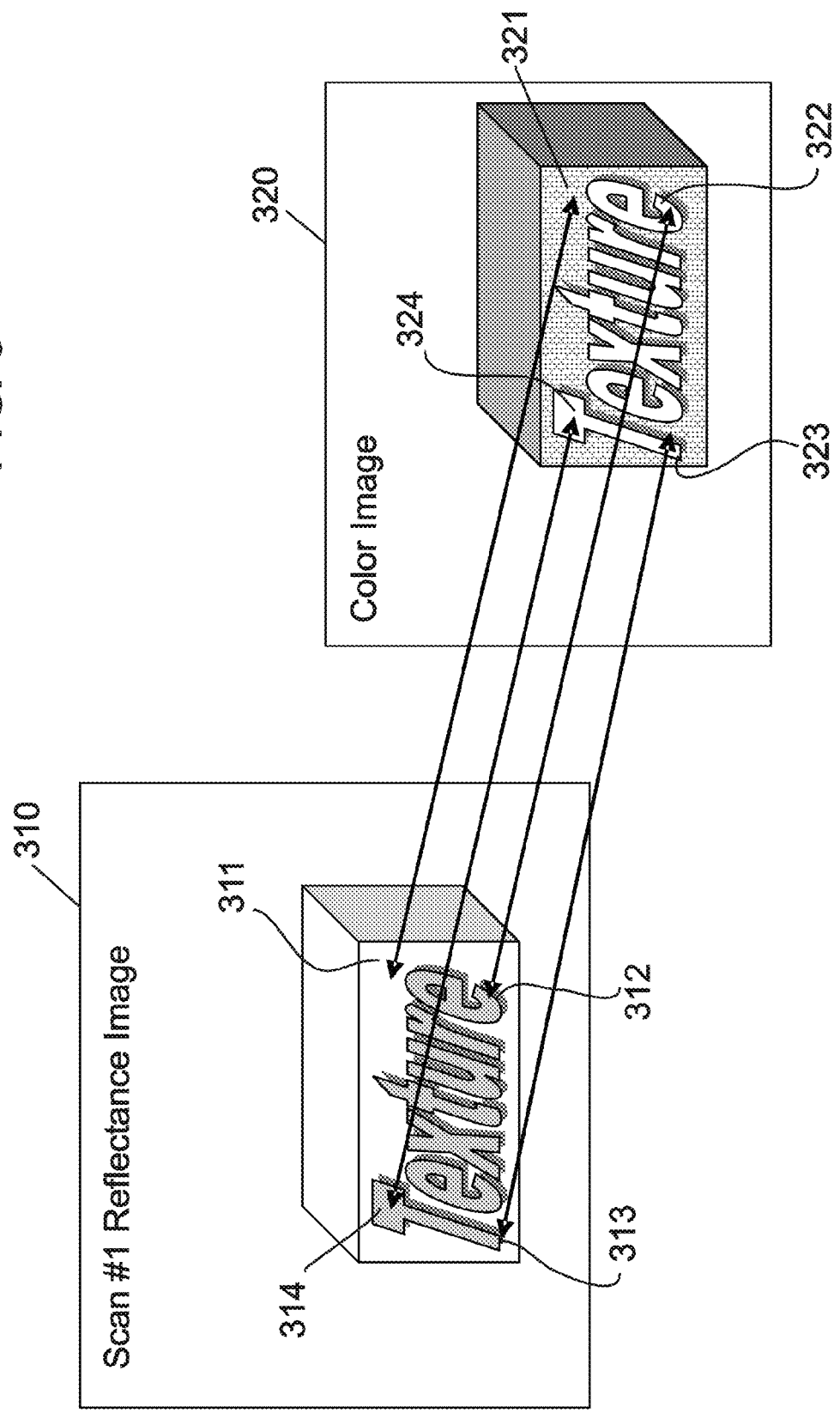
FIG. 3 is a diagram illustrating corresponding range and color information for a registered color image representing a 3D range data set.

A 2D displayed image format such as 510, 530, or 540 is one in which the 3D data set is represented as a 2D image. There are many well-known techniques for doing this since the data from typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. The 2D displayed image need not be represented in spherical projection, but in any other well-known projection of a 3D data set to a 2D display. As illustrated in FIG. 2, each pixel may have a multiplicity of associated values stored with it, including precise azimuth angle value 210, precise elevation angle value 220, range value 230, reflectance value 240, color 250 (RGB), and any other useful values 260. The color of each pixel with in the 2D displayed image may be determined in any of a number of well-known formats. A Range Image has a false color assigned to each pixel based on its range. A Reflectance Image such as 510 or 540 has a color assigned to each pixel based on the intensity of the reflected laser beam. A Registered Color Image such as 530 has a color assigned to each pixel based on the color obtained from a color sensor such as a 2D digital camera such that the range data and color data are aligned as shown in FIG. 3.

The user can next proceed to add calculated geometric entities to the displayed 2D or 3D representation of the 3D data set of interest. There are many types of useful calculated geometric entities which are distinct from physical objects. For example, the trajectory of a projectile is a calculated vector representing where the projectile might have traveled during a particular time, not a physical representation of the projectile itself. For another example, the origin of an explosion is a calculated point in space, not the physical explosive material. As another example, the line-of-sight of a person who might have been standing at a particular location is not a physical representation of the person's eyes, but a calculated reconstruction of the path along which objects would have been visible to the person. As another example, the area of the floor over which it is calculated that a liquid would flow if a certain amount were poured from a particular height is a calculated surface and not a physical representation of the liquid. As another example, the volume swept out by the theoretical reach of a person's left arm while standing in a particular spot in a room is not a representation of the physical person, but of all the space throughout which the person's left arm could move. All of the above are examples of calculated geometric entities and it should be readily apparent that there are a host of other useful examples of this class.

A calculated geometric entity may have some or all of its geometric definition automatically generated by software appropriate to the particular application. A calculated geometric entity may also have some or all of its geometric definition entered as numeric values using a keyboard or imported from another program or data file.

A calculated geometric entity may be automatically or interactively created using well-known techniques for determining the trajectory of blood or other fluid spatter. These techniques are disclosed in publications such as "Henry Lee's Crime Scene Handbook" by Henry Lee, Timothy Palmbach, and Marilyn T. Miller (Academic Press 2000), "Flight Characteristics and Stain Patterns of Human Blood" by Herbert L. MacDonell (Washington D.C., US Government Printing Office, 1971), or "Blood Dynamics" by Anita Y. Wonder (Academic Press, 2001). In addition, a calculated geometric entity may be automatically or interactively created using well-known techniques for determining the trajectory of explosion fragments. It will also be appreciated that multiple calculated geometric entities may be specified.

The display of the calculated geometric entities may be merged with the display of the 3D data set representing the physical 3D scene using at least two methods. In a first method, the 3D data representing a calculated vector, surface, or volume is first merged with the 3D data set representing the physical 3D scene and then the resulting merged 3D data set is displayed using any of the techniques discussed above.

In an additional method, the 3D data set representing the physical 3D scene may be displayed first using any of the above display techniques and then a display of the calculated geometric entities may be overlaid on the first display. Alternatively, the display of the calculated geometric entities may be merged with the first display in some fashion such as by using a z-buffer for visible surface determination. There are many well-known computer graphics techniques that are useful for displaying the calculated geometric entities. Furthermore the calculated geometric entity may be displayed using a different technique from the display of the physical 3D scene. For example the physical 3D scene may be represented as a texture-mapped solid 3D surface while the calculated area of a liquid spill might be represented as a mesh, all within the same 3D displayed image.

Using well-known 3D computer graphics techniques, all or a portion of calculated geometric entities may be drawn in an image as appropriate for that image. For example, a bullet trajectory may be drawn as a 3D cylinder within a 3D display of a scanned crime scene, or the same trajectory may be drawn as a 2D line within an associated 2D reflectance image from the 3D range data.

In order to correctly position a calculated geometric entity within the displayed physical environment, the user may rely on a position and orientation which has been completely or partly automatically calculated relative to the physical space. For example, a calculated bullet trajectory vector may be automatically created based on the orientation of 3D data representing a rod which had been placed in a bullet hole and subsequently scanned by a 3D rangefinder when it acquired the 3D data set of the physical scene. Note that while conventional 3D data represents the rod as a conventional physical structure, the bullet trajectory vector itself is a calculated geometric entity novel to the present invention.

The user may also interactively specify position and orientation of a calculated geometric entity by selecting features within the displayed physical environment. Combinations of techniques are possible. For example, the user may select a blood spot feature on a wall and then add a calculated blood spatter trajectory at a calculated angle which terminates at that feature. Or a user may specify multiple feature points within the 3D physical scene where debris from an explosion was found and then specify calculated vectors back to the calculated point in space where an explosion may have originated.

In order to facilitate such interactive operations, the user may specify particular features in images by identifying a particular pixel within a 2D or 3D displayed image which will allow the calculation of the X, Y, and Z coordinates of the data represented by that pixel. For example, the user might use a mouse or other control device to position a cursor such as a crosshairs over a desired pixel within a 2D reflectance image. Since the azimuth 210, elevation 220, and range 230 values for a 3D range sample are associated with the pixel, simple trigonometry can be used to convert from spherical to Cartesian coordinates and obtain the corresponding X, Y, and Z values. In an additional feature specification technique, the image might be zoomed in so that an image data pixel covers a 10×10 array of pixels on the screen. In that case, the cursor could be used to indicate a sub-pixel location to within 0.1 pixel and more accurate X, Y, and Z values can be readily interpolated based on the sub-pixel location and azimuth, elevation, and range values associated with neighboring pixels. In a related additional feature specification technique a point on a 3D surface might be selected with a cursor and then the X, Y, and Z values may be calculated by interpolating between the actual 3D range data points that define the surface. In another feature specification technique, the method can be extended to cover holes and data interpolated across holes (holes are places where the 3D rangefinder did not acquire a range measurement because of insufficient returned laser energy or other reasons). An interactive or automated software tool may allow the user to estimate and specify the location of a feature point anywhere within a hole even though that particular location is not directly associated with a measured 3D range data point. For example the user may interactively or automatically estimate and specify the location of the center of a circular hole in a 2D or 3D displayed image. Calculation of the bi-linear, bi-cubic, or other interpolation of surrounding measured range data points can then yield the estimated feature point location.

Figure 6:
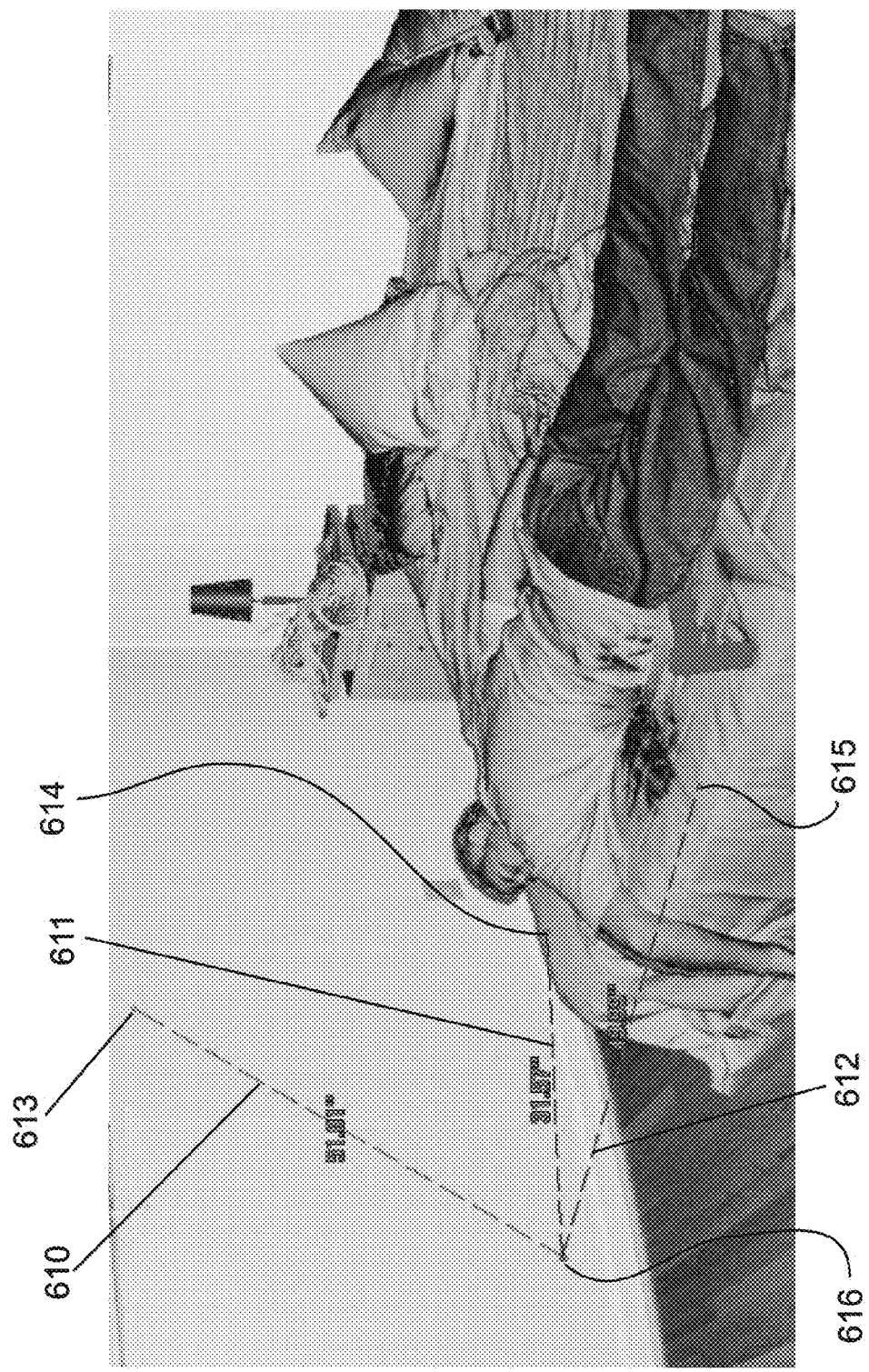
FIG. 6 is a diagram illustrating a 2D reflectance image representing a 3-D data set and showing simulated 3D bullet trajectories and images thereof, according to some embodiments of the present invention.

FIG. 6 illustrates one aspect of embodiments of the present invention Bullet trajectories 610, 611, and 612 have been interactively specified within a 2D reflectance image display representing a 3D data set of a (simulated) murder scene acquired by a 3D rangefinder. The user has specified three end points 613, 614, and 615 located on physical surfaces in addition to a calculated point in space 616 where these trajectories intersect.

Figure 7:
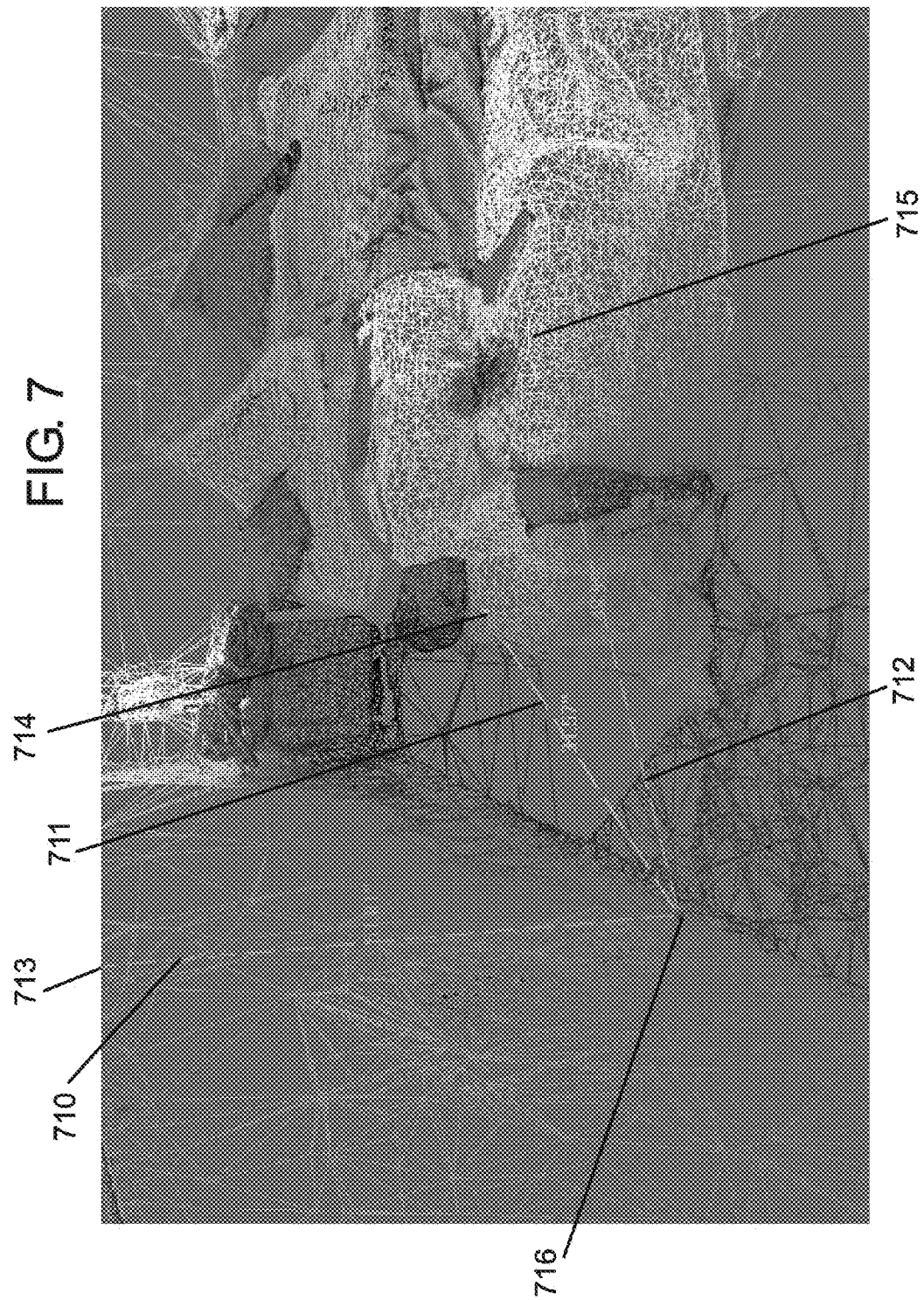
FIG. 7 is a diagram illustrating a 3D mesh display representing a 3-D data set and showing simulated 3D bullet trajectories and images thereof, according to some embodiments of the present invention.

FIG. 7 illustrates a further aspect of embodiments of the present invention Bullet trajectories 710, 711, and 712 have been interactively specified within a 3D displayed image representing a 3D data set of a (simulated) murder scene acquired by a 3D rangefinder. The scene is displayed as a 3D mesh and may be viewed from any perspective using well-known 3D computer graphics techniques. The user has specified three end points 713, 714, and 715 located on physical surfaces in addition to a calculated point in space 716 where these trajectories intersect.

Figure 8:
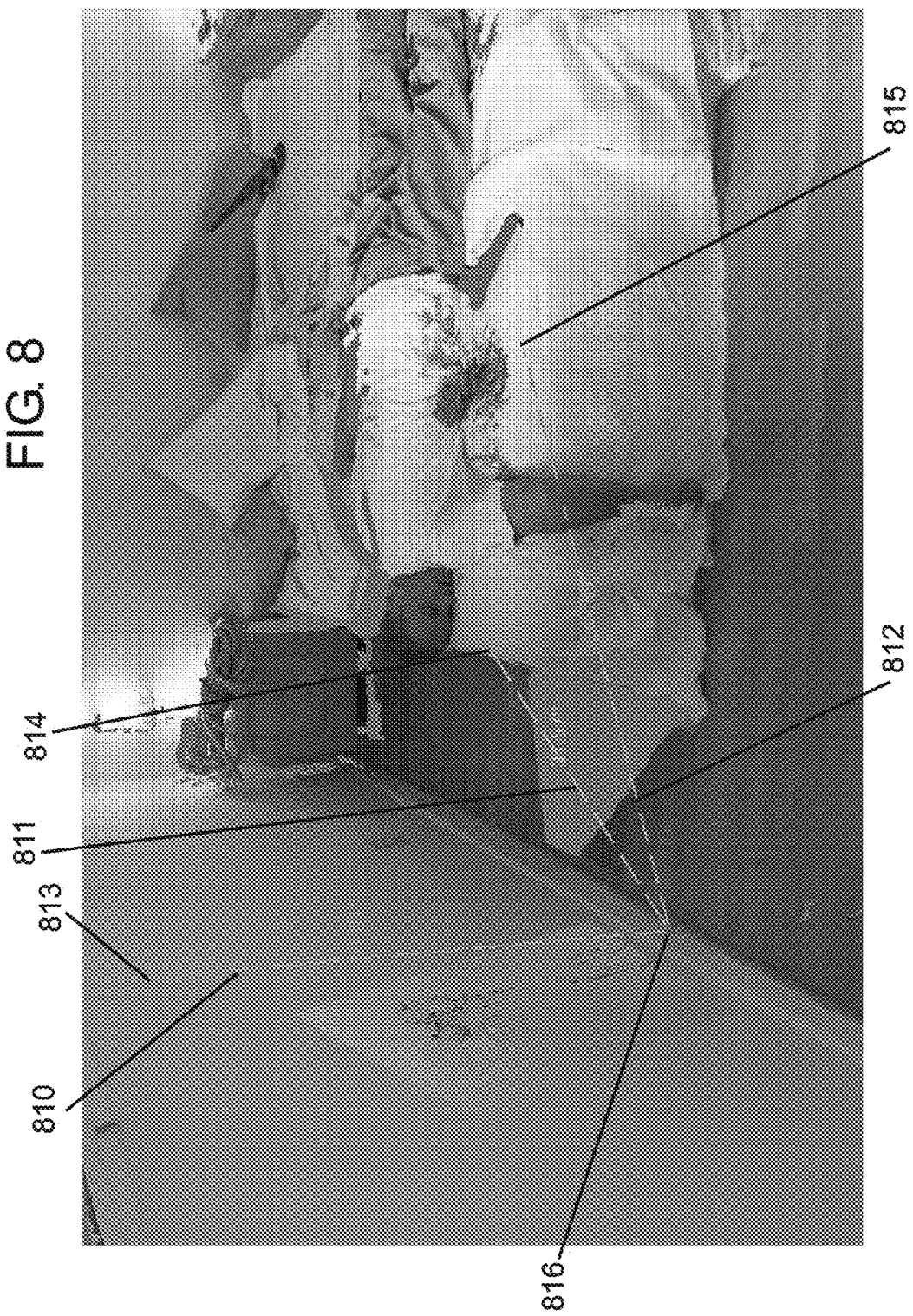
FIG. 8 is a diagram illustrating a 3D texture-mapped surface display representing a 3-D data set and showing simulated 3D bullet trajectories and images thereof, according to some embodiments of the present invention.

FIG. 8 illustrates a further aspect of embodiments of the present invention. Bullet trajectories 810, 811, and 812 have been interactively specified within a 3D displayed image representing a 3D data set of a simulated murder scene acquired by a 3D rangefinder. The scene is displayed as a 3D colored surface and may be viewed from any perspective using well-known 3D computer graphics techniques. The user has specified three end points 813, 814, and 815 located on physical surfaces in addition to a calculated point in space 816 where these trajectories intersect.

Figure 9:
FIG. 9 is a diagram illustrating a 3D texture-mapped surface display representing a 3-D data set and showing simulated blood spatter.

FIG. 9 illustrates a simulated blood spatter 910 added to a wall in a 3D displayed image representing a 3D data set of a (simulated) murder scene acquired by a 3D rangefinder. The scene is displayed as a 3D colored surface and may be viewed from any perspective using well-known 3D computer graphics techniques.

Figure 10:
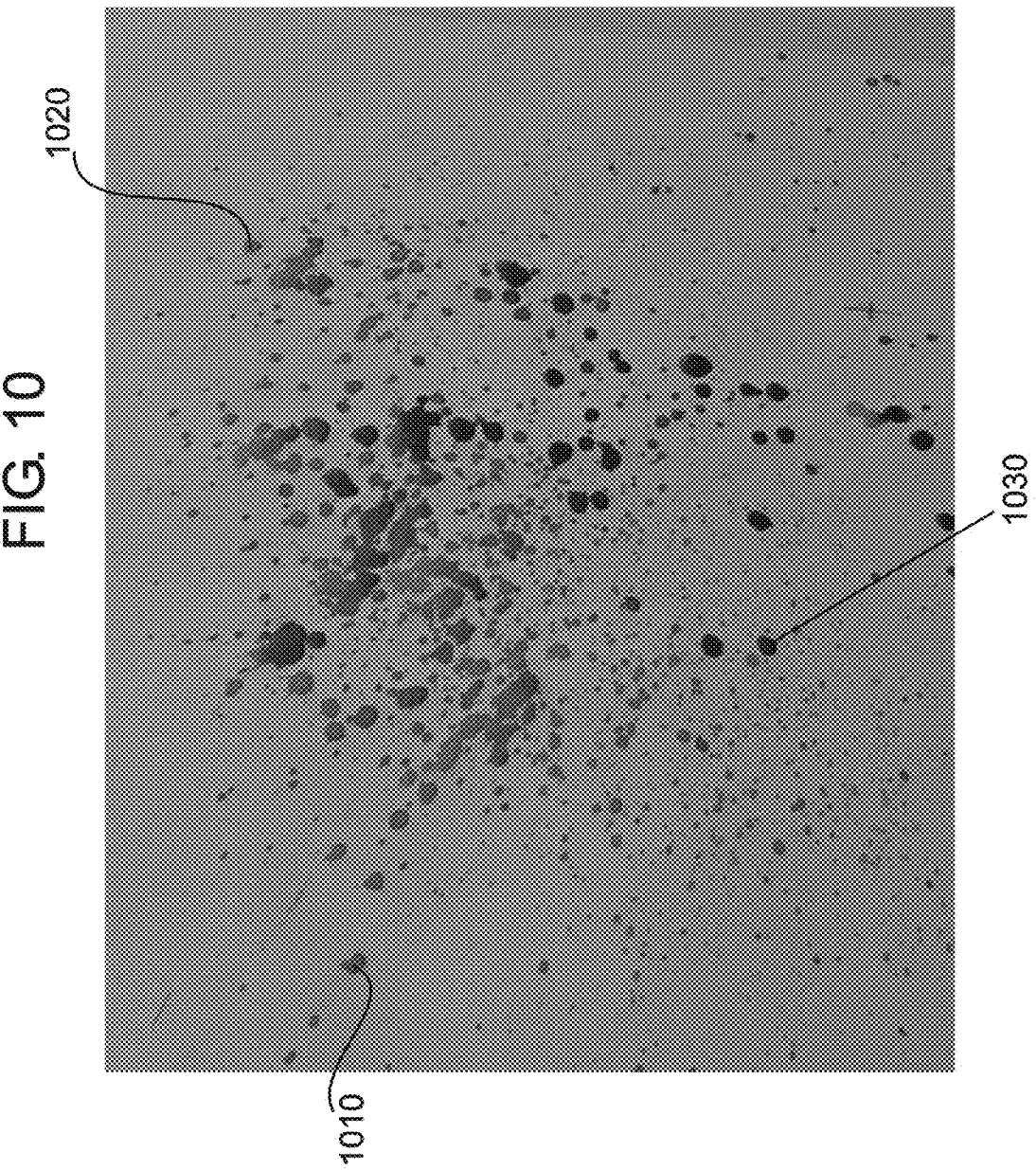
FIG. 10 is a diagram illustrating a 3D texture-mapped surface display representing a 3-D data set and showing a close-up view of simulated blood spatter.

FIG. 10 illustrates a close-up view of a simulated blood spatter droplets such as 1010, 1020, and 1030 added to a wall in a 3D displayed image representing a 3D data set of a simulated murder scene acquired by a 3D rangefinder. The scene is displayed as a 3D colored surface and may be viewed from any perspective using well-known 3D computer graphics techniques.

Figure 11:
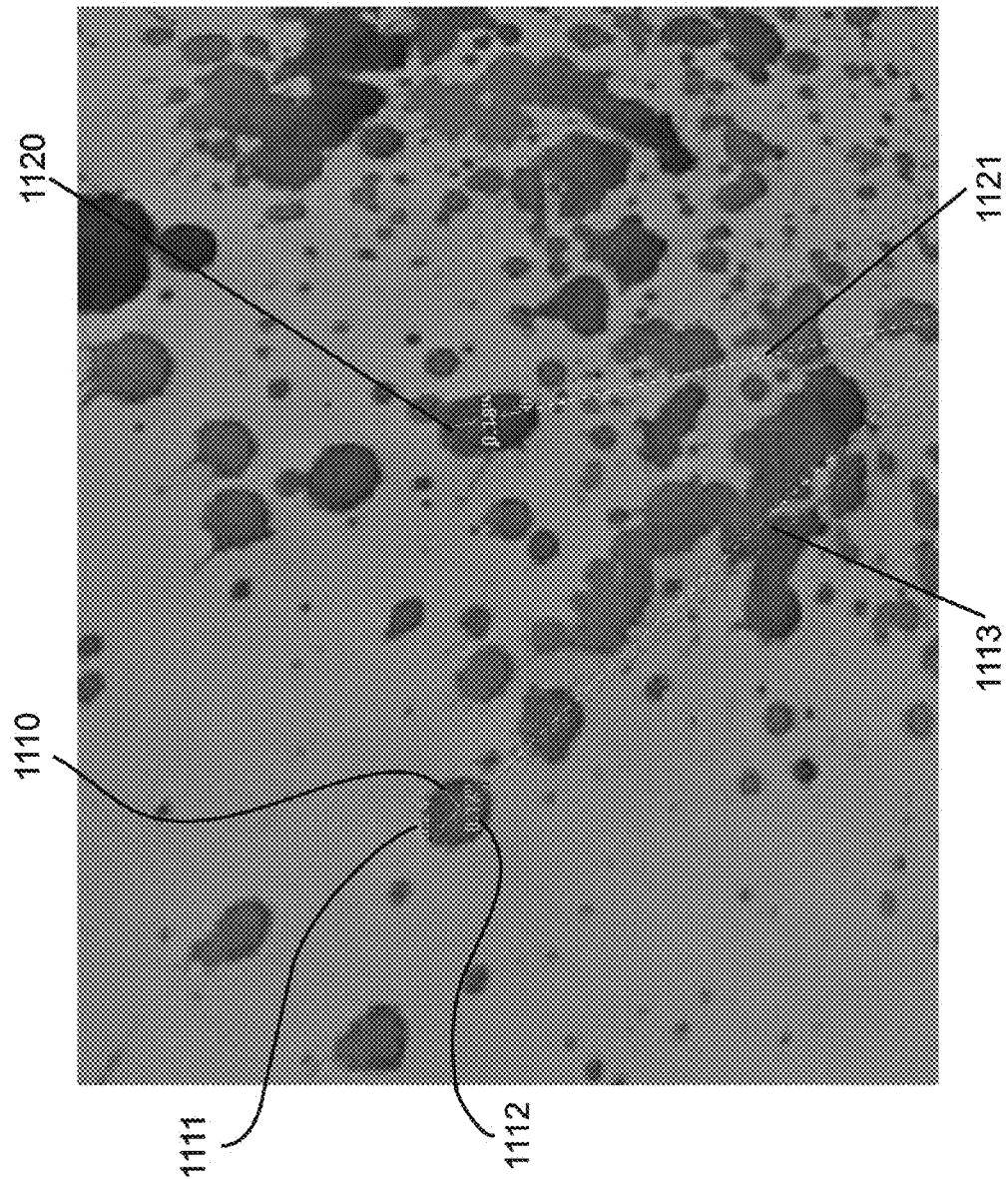
FIG. 11 is a diagram illustrating a 3D texture-mapped surface display representing a 3-D data set and showing a close-up view of simulated blood spatter along with calculated trajectories and images thereof, according to some embodiments of the present invention.

FIG. 11 illustrates a further aspect of embodiments of the present invention. FIG. 11 illustrates a close-up view of simulated blood spatter droplets such as 1110 and 1120 added to a wall in a 3D displayed image representing a 3D data set of a simulated murder scene acquired by a 3D rangefinder. Lines 1111 and 1112 representing interactive measurements of the size and orientation of droplet 1110 were used to calculate a vector 1113 representing the direction of the droplet trajectory within the plane of the wall. Similarly measurements of droplet 1120 were used to calculate a vector 1121 representing the direction of the droplet trajectory within the plane of the wall. The scene is displayed as a 3D colored surface and may be viewed from any perspective using well-known 3D computer graphics techniques.

Figure 12:
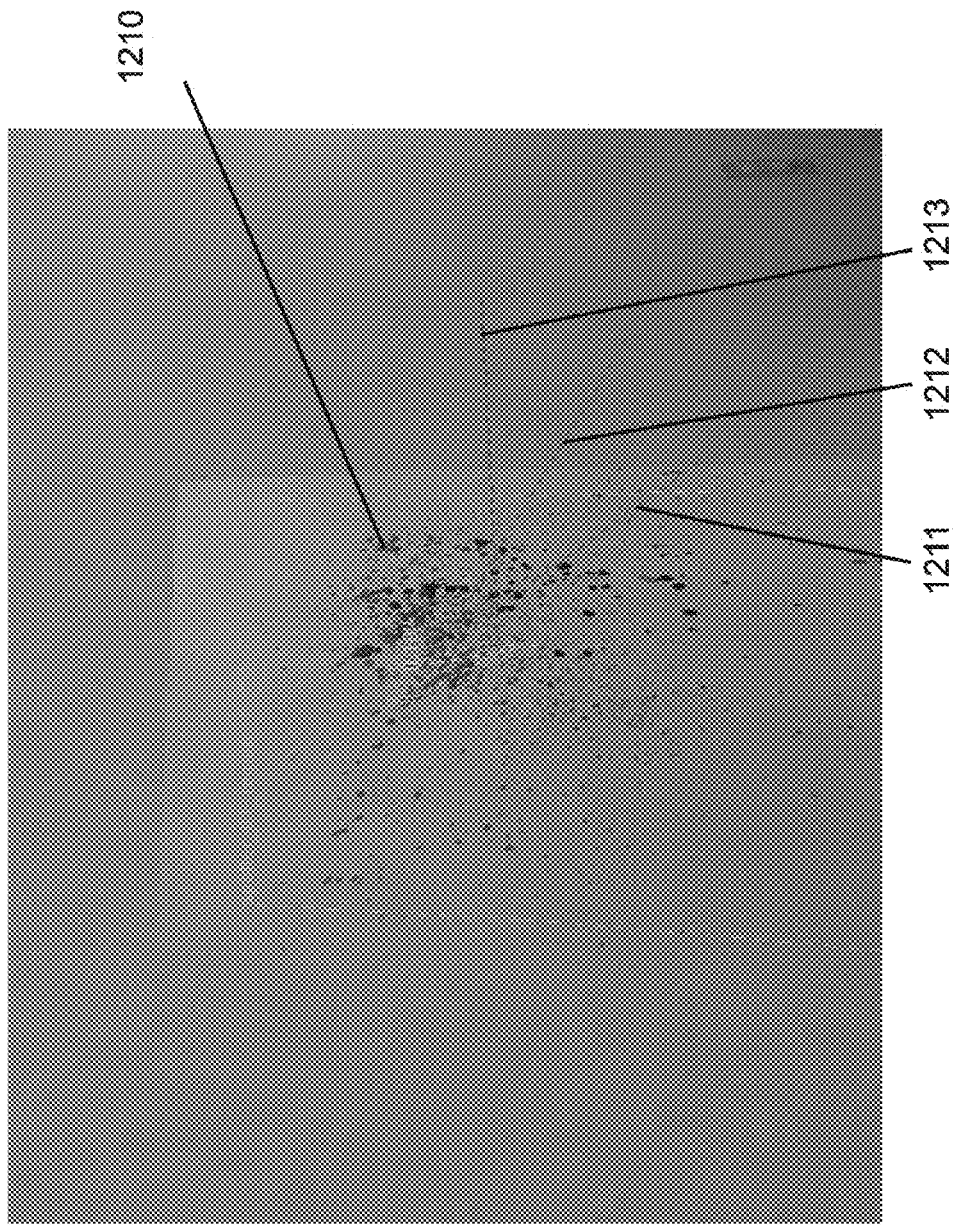
FIG. 12 is a diagram illustrating a 3D texture-mapped surface display representing a 3-D data set and showing a view of simulated blood spatter along with calculated trajectories and images thereof, according to some embodiments of the present invention.

FIG. 12 illustrates a further aspect of embodiments of the present invention. FIG. 12 illustrates a view of (simulated) blood spatter 1210 added to a wall in a 3D displayed image representing a 3D data set of a simulated murder scene acquired by a 3D rangefinder. Measurements of blood spatter droplets were used to calculate and display 3D spatter trajectories 1211 and 1212. A normal vector 1213 from the wall to the intersection of the trajectories has also been calculated and displayed. The scene is displayed as a 3D colored surface and may be viewed from any perspective using well-known 3D computer graphics techniques.

FIG. 13 illustrates a further aspect of embodiments of the present invention. FIG. 13 illustrates an overview of simulated blood spatter 1310 added to a wall in a 3D displayed image representing a 3D data set of a simulated murder scene acquired by a 3D rangefinder. Measurements of blood spatter droplets were used to calculate and display 3D spatter trajectories 1320. The scene is displayed as a 3D colored surface and may be viewed from any perspective using well-known 3D computer graphics techniques.

Thus it can be readily understood that method embodiments of the present invention provide enhanced utility of 3D data sets of physical scenes and objects acquired by 3D rangefinders. The ability to integrate the display of calculated geometric entities with the display of physical data provides significantly greater capability for reconstruction, understanding, analysis, and presentation of complex events such as crime, accident, and terrorism scenes.

Many modifications and other embodiments of the invention will come to mind to one skilled in the art to which this invention pertains having the benefit of the teachings presented in the foregoing descriptions and the associated figures. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limiting the scope of the present invention in any way.

What is claimed is:

1. A method for displaying a calculated geometric entity within at least one 3D range data set, comprising:
   at a computer processor for rendering 3D range data as a 2D displayed image:
   representing a provided first 3D range data set as at least one 2D displayed image, wherein the first 3D range data set represents physical objects of a scene;
   specifying a calculated geometric entity for representing a non-physical entity, wherein the calculated geometric entity represents something other than the physical objects represented by the first 3D range data set, wherein the calculated geometric entity is not represented by the first 3D range data set, and wherein specifying at least some part of the calculated geometric entity is provided from the group consisting of: manually entering the calculated geometric entity, entering the calculated geometric entity from a computer file, automatically entering the calculated geometric entity, and combinations thereof; and
   displaying the calculated geometric entity merged within the at least one 2D displayed image, wherein displaying the calculated geometric entity comprises displaying the calculated geometric entity as at least one of a calculated 2D or 3D vector, a calculated surface, a calculated volume, a trajectory, a sight line, and combinations thereof.

2. The method of claim 1 wherein representing a provided first 3D range data set as at least one 2D displayed image comprises representing, as at least one displayed image, a first 3D range data set that was obtained using a 3D rangefinder device.

3. The method of claim 2, wherein at least the first 3D range data set is provided by a 3D rangefinder device selected from the group consisting of a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

4. The method of claim 1, wherein the at least one displayed 2D image comprises a 2D image selected from the group consisting of a 2D range image comprising range values from the 3D rangefinder device converted to monochrome, a 2D range image comprising range values from the 3D rangefinder device converted to false color, a 2D reflectance image comprising intensity values of the rangefinding signal reflected from a physical surface and thereafter received by the 3D rangefinder device converted to monochrome, a 2D reflectance image comprising intensity values of the rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

5. The method of claim 1, wherein the at least one 2D displayed image comprises a 2D representation of a 3D image selected from the group consisting of a 3D point display, a 3D point display in orthogonal projection, a 3D point display in perspective projection, a 3D polygonal mesh, a 3D polygonal mesh in orthogonal projection, a 3D polygonal mesh in perspective projection, a 3D surface geometry display, a 3D surface geometry display in orthogonal projection, and a 3D surface geometry display in perspective projection.

6. The method of claim 1, further comprising the steps of providing at least a second 2D displayed image from the first 3D range data set wherein the at least second 2D displayed image comprises a display format different than the display format of the at least one 2D displayed image; and representing the at least second 2D displayed image.

7. The method of claim 6, wherein displaying the calculated geometric entity comprises displaying the calculated geometric entity merged within at least two 2D displayed images.

8. The method of claim 1, further comprising the steps of providing at least a second 3D range data set; and representing the at least second 3D range data set as at least a second 2D displayed image.

9. The method of claim 8, wherein displaying the calculated geometric entity comprises the step of displaying the calculated geometric entity merged within at least one of the 2D displayed images.

10. The method of claim 8, wherein where the second 3D range data set may be obtained from the group consisting of being obtained by the same 3D rangefinder device as the first 3D range data set but obtained from a different 3D location, being obtained by the same 3D rangefinder device as the first 3D range data set from the same 3D location but obtained at a different resolution, being obtained by the same 3D rangefinder device as the first 3D range data set from the same 3D location but obtained at a different time, being obtained by a different 3D rangefinder device as the first 3D range data set and obtained at the same 3D location, being obtained by a different 3D rangefinder device as the first 3D range data set and obtained from a different 3D location, and being obtained by a different 3D rangefinder device as the first 3D range data set and obtained at a different time.

11. The method of claim 1, implemented in a computer processor executing a suitable computer software program product therein.

12. The method of claim 1, implemented in a suitable computer software program product embodied on computer readable tangible media.

13. A non-transitory computer readable medium having stored thereon computer-executable instructions that when executed by the processor of a computer perform steps comprising:

representing a first 3D range data set as at least one 2D displayed image, wherein the first 3D range data set represents physical objects of a scene;

specifying a calculated geometric entity for representing a non-physical entity, wherein the calculated geometric entity represents something other than the physical objects represented by the first 3D range data set, wherein the calculated geometric entity is not represented by the first 3D range data set, and wherein specifying at least some part of the calculated geometric entity is provided from the group consisting of: manually entering the calculated geometric entity, entering the calculated geometric entity from a computer file, automatically entering the calculated geometric entity, and combinations thereof; and displaying the calculated geometric entity merged within the at least one 2D displayed image, wherein displaying the calculated geometric entity comprises displaying the calculated geometric entity as at least one of a calculated 2D or 3D vector, a calculated surface, a calculated volume, a trajectory, a sight line, and combinations thereof.

14. The non-transitory computer readable medium of claim 13, further comprising the steps of providing at least a second 2D displayed image from the first 3D range data set wherein the at least second 2D displayed image comprises a display format different than the display format of the at least one 2D displayed image; and representing the at least second 2D displayed image.

15. The non-transitory computer readable medium of claim 13, further comprising the steps of providing at least a second 3D range data set; and representing the at least second 3D range data set as at least a second 2D displayed image.

16. The non-transitory computer readable medium of claim 13 wherein representing a first 3D range data set as at least one 2D displayed image comprises representing, as at least one 2D displayed image, a first 3D range data set that was obtained using a 3D rangefinder device.

17. An apparatus for displaying a calculated geometric entity within at least one 3D range data set, comprising:
- at least one computer processor;
- a computer program product executing within the at least one computer processor, wherein the computer program product further comprises at least the following software modules therein;
- a first software module for providing a first 3D range data set, wherein the first 3D range data set represents physical objects of a scene;
- a second software module for representing the first 3D range data set as at least one 2D displayed image;
- a third software module for specifying a calculated geometric entity for representing a non-physical entity, wherein the calculated geometric entity represents something other than the physical objects represented by the first 3D range data set, wherein the calculated geometric entity is not represented by the first 3D range data set, and wherein specifying at least some part of the calculated geometric entity is provided from the group consisting of: manually entering the calculated geometric entity, entering the calculated geometric entity from a computer file, automatically entering the calculated geometric entity, and combinations thereof; and
- a fourth software module for displaying the calculated geometric entity merged within the at least one 2D displayed image, wherein displaying the calculated geometric entity comprises displaying the calculated geometric entity as at least one of a calculated 2D or 3D vector, a calculated surface, a calculated volume, a trajectory, a sight line, and combinations thereof.

18. The apparatus of claim 17 wherein displaying the calculated geometric entity comprises displaying the calculated geometric entity as at least one of a calculated 2D or 3D vector, a calculated surface, a calculated volume, a path or trajectory, a sight line, and combinations thereof.

19. The apparatus of claim 17, further comprising the steps of providing at least a second 2D displayed image from the first 3D range data set wherein the at least second 2D displayed image comprises a display format different than the display format of the at least one 2D displayed image; and representing the at least second 2D displayed image.

20. The apparatus of claim 17, further comprising the steps of providing at least a second 3D range data set; and representing the at least second 3D range data set as at least a second 2D displayed image.

21. The apparatus of claim 17 wherein the first 3D range data set comprises a 3D range data set that was obtained using a 3D rangefinder device.

* * * * *